(12) United States Patent
Rivera et al.

(10) Patent No.: US 12,324,506 B2
(45) Date of Patent: Jun. 10, 2025

(54) SMART BRUSHES AND ACCESSORIES SYSTEMS AND METHODS

(71) Applicants: Manolo Fabio Rivera, Elmhurst, NY (US); Prem Makeig, Brooklyn, NY (US)

(72) Inventors: Manolo Fabio Rivera, Elmhurst, NY (US); Prem Makeig, Brooklyn, NY (US)

( * ) Notice: Subject to any disclaimer, the term of this patent is extended or adjusted under 35 U.S.C. 154(b) by 0 days.

(21) Appl. No.: 17/314,421

(22) Filed: May 7, 2021

(65) Prior Publication Data

US 2021/0259401 A1    Aug. 26, 2021

Related U.S. Application Data

(63) Continuation of application No. 16/030,792, filed on Jul. 9, 2018, now Pat. No. 11,000,118.

(Continued)

(51) Int. Cl.
| | |
|---|---|
| *A46B 15/00* | (2006.01) |
| *A01K 13/00* | (2006.01) |
| *A46B 5/00* | (2006.01) |
| *A46B 17/08* | (2006.01) |
| *F16M 11/04* | (2006.01) |

(Continued)

(52) U.S. Cl.
CPC ........ *A46B 15/0022* (2013.01); *A01K 13/002* (2013.01); *A46B 5/005* (2013.01); *A46B 15/0004* (2013.01); *A46B 15/0042* (2013.01); *A46B 17/08* (2013.01); *F16M 11/041* (2013.01); *F16M 11/28* (2013.01); *F16M 13/00* (2013.01); *G03B 17/566* (2013.01); *G06N 5/046* (2013.01); *G06N 20/00* (2019.01); *G08B 3/10* (2013.01); *G08B 5/36* (2013.01); *G08B 6/00* (2013.01); *G08B 25/08* (2013.01); *G08B 25/10* (2013.01); *H04N 23/60* (2023.01); *H04N 23/63* (2023.01); *H04N 23/65* (2023.01); *H04N 23/66* (2023.01);

(Continued)

(58) Field of Classification Search
CPC ..... A46B 15/00; A46B 15/0022; A46B 5/005; G08B 5/36; H04N 23/60; G03B 17/566
See application file for complete search history.

(56) References Cited

U.S. PATENT DOCUMENTS

2005/0073141 A1 * 4/2005 Baird ................ B60P 1/56
280/766.1

* cited by examiner

*Primary Examiner* — Michael D Jennings
(74) *Attorney, Agent, or Firm* — Manolo F Rivera; Manolo Fabio Rivera

(57) ABSTRACT

The present invention comprises systems and methods for using a specialized styling device, such as a smart hairbrush, smart comb, or accessories, which allow for the collection of data from the devices, and for users to interact over a wireless network. The devices may including a wireless radio frequency modem connected to the internet and a battery to power components, including lights, speakers, cameras, microphones, and sensors. A smart brush may allow for computations through processors, memory, system-on-a-chip, applications, batteries, operating systems, and wired or wireless communication interfaces. It is also possible for the smart brush to connect with other electronic devices, including phones, tablets, and cameras in order to share electrical power and communicate over one or more interfaces. A smart brush may operate as an independent mobile device or within a smart home or other system with multiple computing devices, appliances, and sensors connected together within a network.

18 Claims, 26 Drawing Sheets

Related U.S. Application Data

(60) Provisional application No. 62/530,414, filed on Jul. 10, 2017.

(51) Int. Cl.
  *F16M 11/28* (2006.01)
  *F16M 13/00* (2006.01)
  *G03B 17/56* (2021.01)
  *G06N 5/046* (2023.01)
  *G06N 20/00* (2019.01)
  *G08B 3/10* (2006.01)
  *G08B 5/36* (2006.01)
  *G08B 6/00* (2006.01)
  *G08B 25/08* (2006.01)
  *G08B 25/10* (2006.01)
  *H04N 23/60* (2023.01)
  *H04N 23/63* (2023.01)
  *H04N 23/65* (2023.01)
  *H04N 23/66* (2023.01)

(52) U.S. Cl.
  CPC ...... *A46B 2200/104* (2013.01); *G03B 17/563* (2013.01)

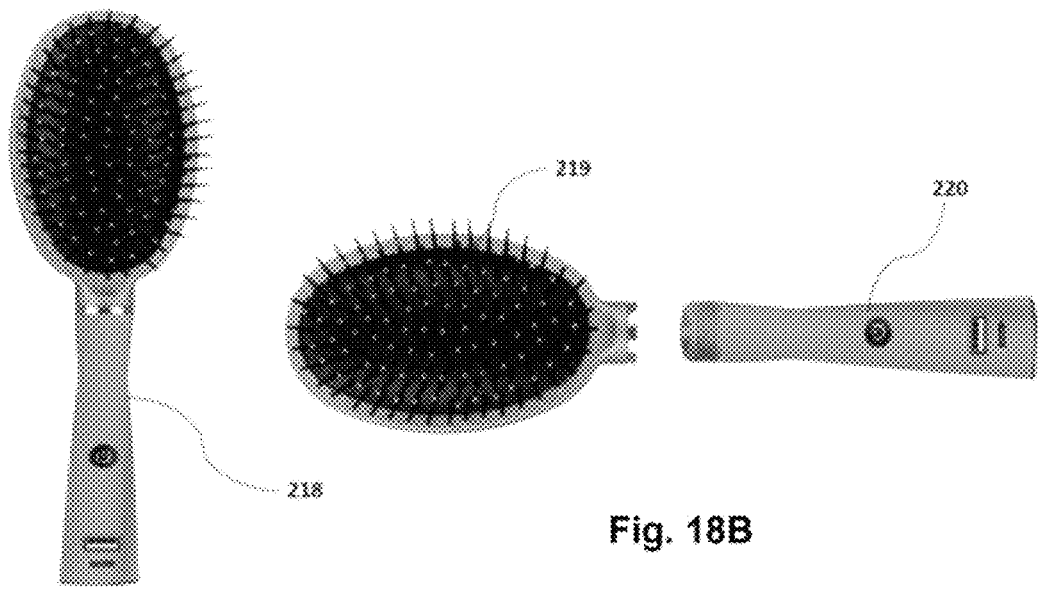
Fig. 18A
Fig. 18B
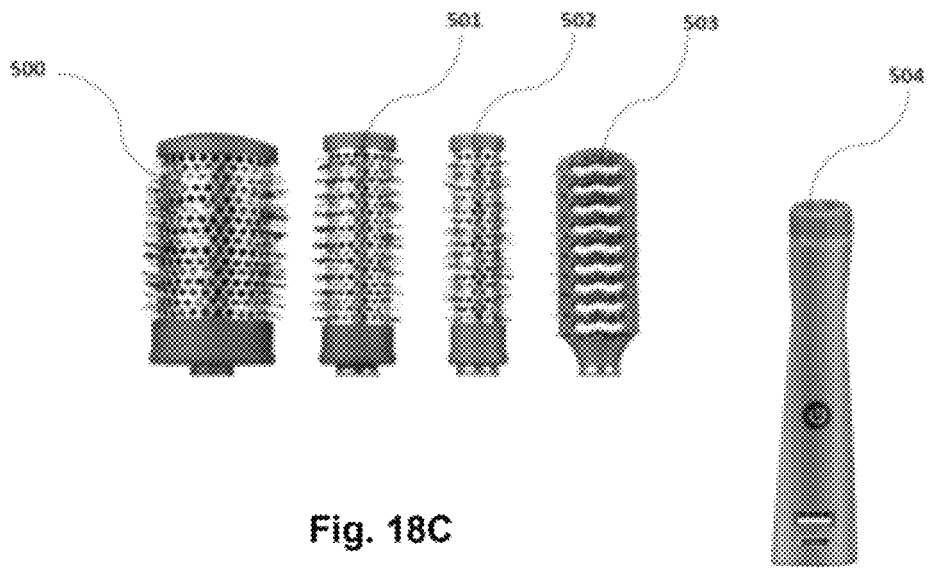
Fig. 18C
Fig. 18D

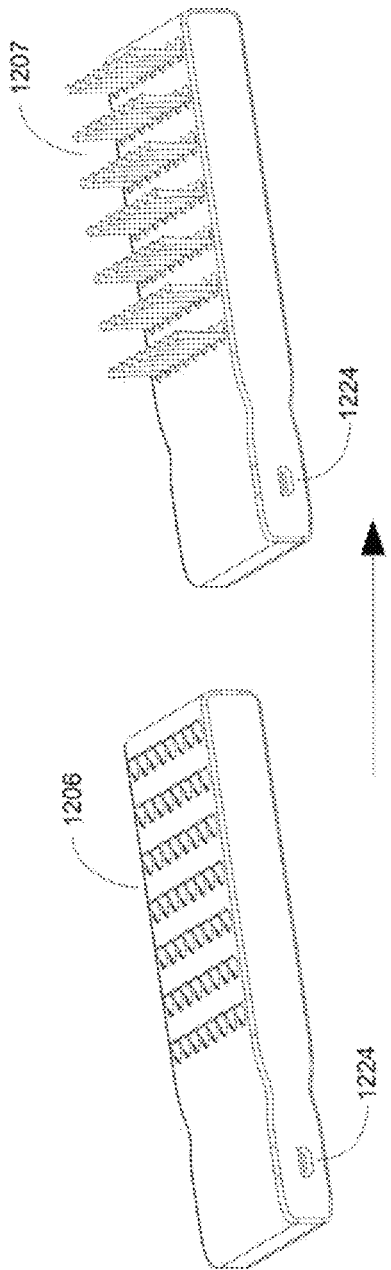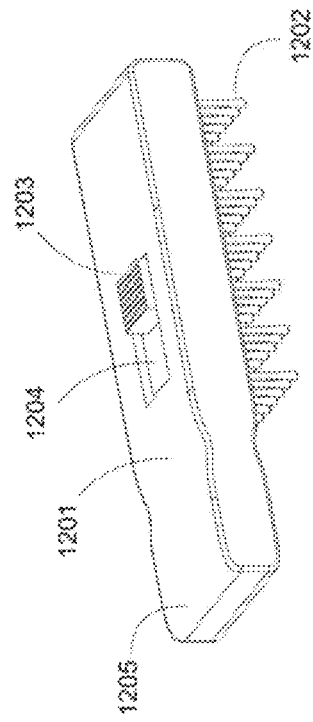

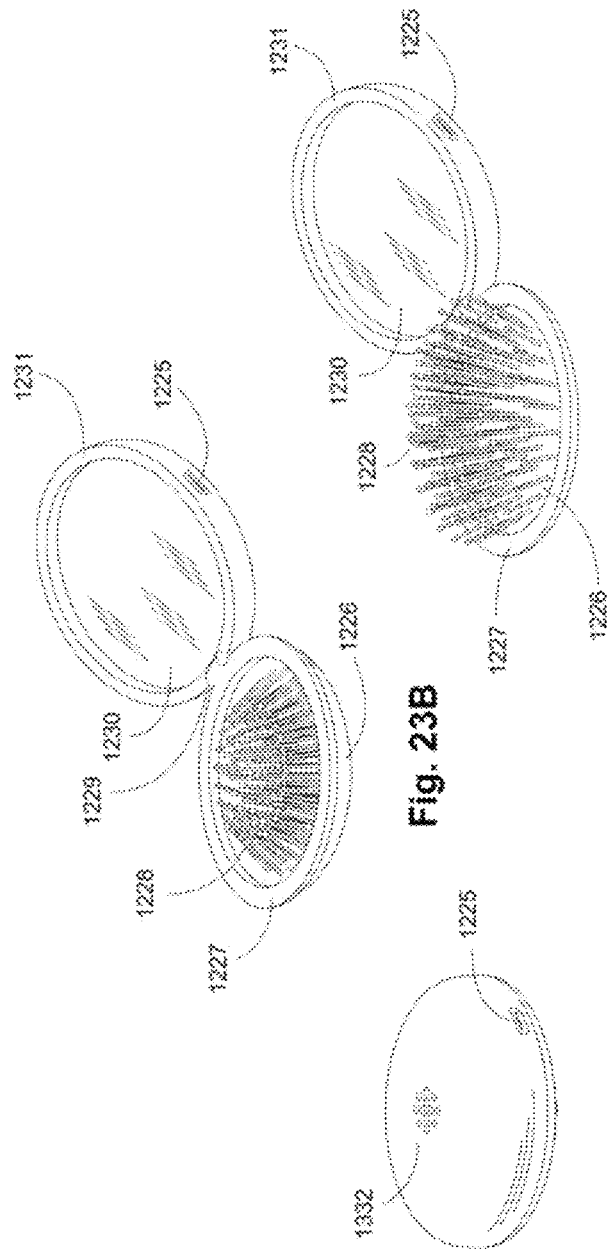

SMART BRUSHES AND ACCESSORIES SYSTEMS AND METHODS

CROSS-REFERENCE TO RELATED APPLICATION

This application is a continuation of U.S. patent application Ser. No. 16/030,792 filed on Jul. 9, 2018, which claims the priority of U.S. Provisional Patent App. No. 62/530,414, filed on Jul. 10, 2017, the entirety of these patent applications are hereby incorporated by reference.

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM (EFS-WEB)

Not Applicable

STATEMENT REGARDING PRIOR DISCLOSURES BY THE INVENTOR

Not Applicable

BACKGROUND

Unless otherwise indicated herein, the materials described in this section are not prior art to the claims in this application and are not admitted to be prior art by inclusion in this section.

1. Field of the Invention

The present invention relates generally to brushes. More specifically, the present invention relates to improvements to brushes to communicate with other things.

2. Description of Related Art

Recently, more and more devices are becoming "smart" by incorporating electronics. These smart electronics often include a wired or wireless communication interface, such that the smart device is able to send and receive data over a network including the internet. Some examples include smart thermostats, which are able to be controlled by a remote device, i.e. a phone or computer connected to the internet. Other examples include smart door locks, which can be opened with a phone over a radio frequency (RF) connection, such as Bluetooth or Wi-Fi. Further examples include a smart pedometer, which can send the data collected about a person's movement over a network to a server connected to the internet. The aggregation of these devices is often called the internet of things (IOT), and within a home is often called a "smart home".

Smart homes often incorporate a number of smart devices. These smart devices are connected using a network that usually has one or more coordinator devices. These coordinator devices can send and receive data between various devices and may also have a user interface that allows for interaction with a human user. Recently these coordinator devices often comprise one or more speakers and microphones, in order to allow for automatic speech recognition (ASR). Examples of ASR include Amazon's Echo device and Google's Google Home device. It is possible for any other device in the smart home to serve as a user interface for the smart home system, including a smart TV, computer, tablet, phone, or other device. Human users are able to speak directly into the ASR-enabled device, and have their instructions implemented by the various smart devices in the smart home.

One example of using an ASR device might be for a user to say that they want to turn up or down the temperature on a smart thermostat. The thermostat may be connected locally to an ASR device, which may be a standalone smart speaker, such as Amazon's Echo device, which is connected to the internet. The verbal instruction from the user is first interpreted by the ASR device and then a data transmission instruction is sent to the thermostat over the network in order to change the target temperature value within the smart thermostat. In a smart home many different smart devices, which may control traditional appliances, including a central air furnace, can communicate with each other in an unlimited number of ways.

The smart home is being developed on multiple fronts, including in the development of more smart devices and in the smartness of the devices and the network of the devices as a whole. One possible way that a smart home can become "smarter" is by employing various machine-learning techniques including deep learning, which is commonly referred to as Artificial Intelligence (AI). One of the goals of such systems is to understand the normal behavior of a human user of a smart home system. If the normal behaviors of the human user can be understood, then it is possible to predict with some certainty the type of instructions that should be sent and the timing of these instructions to various devices.

Another example is when a smart home user regularly returns to her home at the same time, such as 6:00 p.m. on weekdays, except for Thursdays, when she returns regularly at 8:30 p.m. In this scenario, a coordinating device connected to the internet and an AI system can learn to automatically keep the temperature set at either a minimum or a room temperature according to the understood schedule. This will allow for a significant savings of energy and also create a seamless experience for the smart home user. Whenever the user returns home according to her regular schedule, the home is brought up to room temperature before she arrives.

For example, the smart home system may be able to remind a smart home user before she goes out the door to bring her umbrella, pick up eggs at the store for pancakes the next morning, and remind her about a doctor's appointment. The device of this invention makes this possible by coordinating and connected many devices to a system with a virtual assistant using AI.

While smart home systems are currently under rapid development, systems are also very new and have limited capabilities. For instance, ASR devices have limited functionality, and smart home users are often informed that their instructions cannot be understood or implemented. AI systems that support smart home systems also have many limitations and also have access to a limited amount of data.

Thus, the need exists for a combination of smart devices, ASR interfaces, and AI to allow for smart home users to be able to use many more instructions. Also, the need exists for a smart home system that is better at interpreting data received from more and more smart devices and is reliable, inexpensive, and accurate.

BRIEF SUMMARY OF THE INVENTION

It is a principal object to solve at least one of the disadvantages of other attempted solutions or to create other utility by providing a smart home system that provides many more instructions to a combination of smart devices, ASR interfaces, and AI to allow for a smart home system that is better at interpreting data received from more and more smart devices and is reliable, inexpensive, and accurate.

A specialized styling device, such as a smart hairbrush, smart comb, or accessories, are a new class of smart devices, i.e. smart hairbrush, smart comb, and smart hair clip, allowing for a wide range of "smart" functions to be incorporated into the devices, including capturing data about the human users who use the devices. With the captured data from a smart brush it is possible to analyze the data and to respond when findings are made which require the attention of the user, or remote users of the system, including caregivers. A smart brush is capable of receiving instructions from the user using multiple user interfaces, as well as capturing usage data which can be sent via a network to a server, which can analyze the data, draw conclusions, and finally take action in response to that collected data. In some cases a smart brush in combination with a server and other networked devices can be programmed to understand the user's daily routine, including smart brush usage data.

One of die best ways to interpret all the data received from the many devices in a smart home is to use machine learning. Machine learning enables computer software to "learn" a particular task with data, without requiring specific procedural rules to be programmed for each task. Machine learning is a technique used in the broader field of artificial intelligence. The term "learn" can be understood as the machine learning model getting progressively better at performing a specific task by means of training the model. The training of the model is often done by minimizing a loss function on a training set of example data. Loss functions calculate a deviation between the predictions made by the machine learning model and known actual data. When using classification, a machine learning technique, models are trained to predict output which is provided to the model in the form of labeled data. One popular machine learning method is called deep learning. Deep learning is a type of artificial neural network (ANN) comprising multiple hidden layers. Deep learning is inspired by theories about how human and animal brains might work. ANNs are modeled after features found in biological models of human and animal brains. The parts of the ANN include artificial neurons connected together into a network, including an input layer of artificial neurons, hidden layers of artificial neurons, and an output layer of artificial neurons. A data signal is received by the input layer of neurons and passed through the network to the output layer of neurons. Along the way, the data signals, often numbers between 0 and 1, are modified by the individual artificial neurons. Individual neurons may transform the data signals using basic mathematical operations including multiplication and addition, using constants often called weights and biases, i.e. backpropagation algorithm. Deep learning has been used successfully for computer vision and speech recognition, and has the potential to be used on an almost unlimited number of data analysis problems.

Using machine learning, a model can be generated and used with the system, which allows for real-time or batch data to be inputted into the machine learning model, resulting in predictions which can be acted upon by the system. The actions taken may include at least one indicator light that illuminates on a specialized styling device or smart hairbrush or smart brush, if the brush is being used less frequently than the user's daily routine model's frequency. Another action that can take place is a message. For example, a text message or email may be sent to a caregiver of a child or elderly person, in order to alert the caregiver of a significant change in the user's daily routine. Also, it is possible to have functionality similar to that of the smart brush implemented in other smart accessories including a smart comb, smart hair clip, smart toothbrush, and smart brush for pets and animals.

BRIEF DESCRIPTION OF THE DRAWINGS

The accompanying drawings, which are incorporated in and constitute a part of this specification, illustrate several aspects described below.

FIG. 18A is a drawing of a smart brush of the present invention in which at least one of the embodiments is shown.

FIG. 18B is a drawing of a brush with a disconnected head of the present invention in which at least one of the embodiments is shown.

FIG. 18C is a drawing of a round brush of the present invention in which at least one of the embodiments is shown.

FIG. 18D is a drawing of a handle of the present invention in which at least one of the embodiments is shown.

FIG. 21A is a drawing of the front side of a pocket smart brush with retractable bristles in the retracted position of the present invention in which at least one of the embodiments is shown.

FIG. 21B is a drawing of the backside of a pocket smart brush with a slider button to retract the bristles of the present invention in which at least one of the embodiments is shown.

FIG. 21C is a drawing of the front side of a pocket smart brush with retractable bristles in the extended position of the present invention in which at least one of the embodiments is shown.

FIG. 23A is a drawing of a smart travel pop-up design of the smart brush in the closed position of the present invention in which at least one of the embodiments is shown.

FIG. 23B is a drawing of a smart travel pop-up design of the smart brush in the open position with the bristles not popped-up of the present invention in which at least one of the embodiments is shown.

FIG. 23C is a drawing of a smart travel pop-up design of the smart brush in the open position with the bristles popped-up of the present invention in which at least one of the embodiments is shown.

DETAILED DESCRIPTION OF THE INVENTION

Figure 1:
FIG. 1 is several drawings of people using a smart brush which is able to communicate using an RF connection, and play music in which at least one of the embodiments is shown.

It is to be understood that this invention is not limited to any particular embodiment described, which may vary. Also, it is to be understood that the terminology used herein is for the purpose of describing particular embodiments only, and is not intended to be limiting, since the scope of this invention will be limited only by the appended claims.

In the following detailed description, numerous specific details are set forth in order to explain and provide a thorough understanding of the present invention. However, it is apparent that the present invention may be practiced without all of these specific details. Thus, all illustrations of the drawings are for the purpose of describing versions of the present invention, and are not intended to limit the scope of the invention.

In the following section, the present invention is described fully by referencing the details in the enclosed drawings, which illustrate certain embodiments of the invention. The numbers shown in this specification refer to the corresponding numbers in the enclosed drawings. The terminology used is to describe the particular embodiment shown and is not intended to limit the scope of the invention. The invention may also be embodied in many other forms in addition to the embodiments shown. Thus, the embodiments shown should not be construed as limiting, but rather, to allow a thorough and complete description of the disclosure that conveys the scope of the invention to a person having ordinary skill in the art in the field of this invention. Therefore, for the terms used herein, the singular forms "the," "a," and "an" are intended to include the plural forms as well as the singular forms, unless the context clearly indicates otherwise. The term "and" includes any and all combinations of one or more of the associated listed items. As used herein, the terms "comprising" and "comprises" when used in this specification, identify specific steps, integers, operations, features, components, and elements, but do not preclude the presence or addition of one or more other steps, operations, features, components, and elements. In addition, the features, components, and elements referenced may be exaggerated for clarity.

Unless otherwise defined, all scientific terms, technical terms, or other terms used herein have the same meaning as the term that is understood by one having ordinary skill in the art in the field of this invention. It is also understood that these terms, including their dictionary meaning, should be understood as having the meaning that is consistent with their definitions in the related relevant art. In addition, the present disclosure is not to be interpreted in an idealized or overly formal sense unless expressly stated so herein. Constructions or functions that are well known in the art may not be fully described in detail for brevity.

In describing the invention, it is understood that a number of steps and methods may be disclosed. Each of these may have individual benefit. Also, each may be used in conjunction with at least one or more of the disclosed steps and methods. Therefore, this description will refrain from stating each and every possible combination of the individual steps and methods for the sake of brevity. Regardless, the specification and related claims should be understood with the combinations that are entirely within the scope of the claims and inventions.

The disclosure in this invention are examples of how it may be implemented and are not intended to limit the scope of the invention to the specific embodiments shown in the accompanying drawings or the description provided herein. The present invention will now be described by example in the following paragraphs by referencing the accompanying drawings, which represent embodiments and alternative embodiments.

The detailed embodiments of the present invention are disclosed herein. It should be understood, however, that the disclosed embodiments are merely exemplary of the invention, which may be embodied in various forms. Therefore, the details disclosed herein are not to be interpreted as limiting, but merely as the basis for the claims and as a basis for teaching one skilled in the art how to make and/or use the invention.

The smart brushes and smart accessories systems and methods presented may make brushing hair more enjoyable for children as well as enabling the monitoring of the personal care routines of older people by doctors, family members, or caregivers. Traditionally, brushes and combs have not been computing devices; however, recently the cost, size, and power requirements of computing device components, including processors, memory, and modems have come down, making it feasible to make such everyday items "smart." Within this disclosure is presented various smart devices, a system for operating the devices, as well as methods for their use. A smart brush can be used in multiple ways, and embodiments can include multiple shapes and sizes, and comprise many different combinations of electronic components.

Hair brushes are often used by both human users and caregivers in order to untangle hair, to align the direction of hairs, to shape hair, to remove foreign objects, i.e. lint, and to generally make the appearance of hair more visually appealing.

FIG. 1 shows several drawings of people using a smart brush which is able to communicate using an RF connection, and play music. Detail 181 shows a smart brush transmitting an RF signal in order to connect to a network being used by a woman. Detail 180 shows a smart brush transmitting an RF signal in order to connect to a network being used by a caregiver on a child with music being played by the smart brush. Detail 182 shows a smart brush transmitting an RF signal in order to connect to a network being used by an older woman.

For children 180 with longer hair, it is possible for the hairs to become tangled, or even knotted, which makes untangling the hair with a comb or brush difficult and can often result in pulling of the hair, which can be uncomfortable for the child. It has been shown that pain can be reduced with music or other types of visual or audio distractions. An embodiment of the smart brush includes a computing device, including the necessary components described in this disclosure in order to play music. A caregiver of a child who is getting her hair brushed 180 would be able to use voice commands to request music to be played by the smart brush. The child could also speak commands to the smart brush, and have a sound recording played.

Figure 2A:
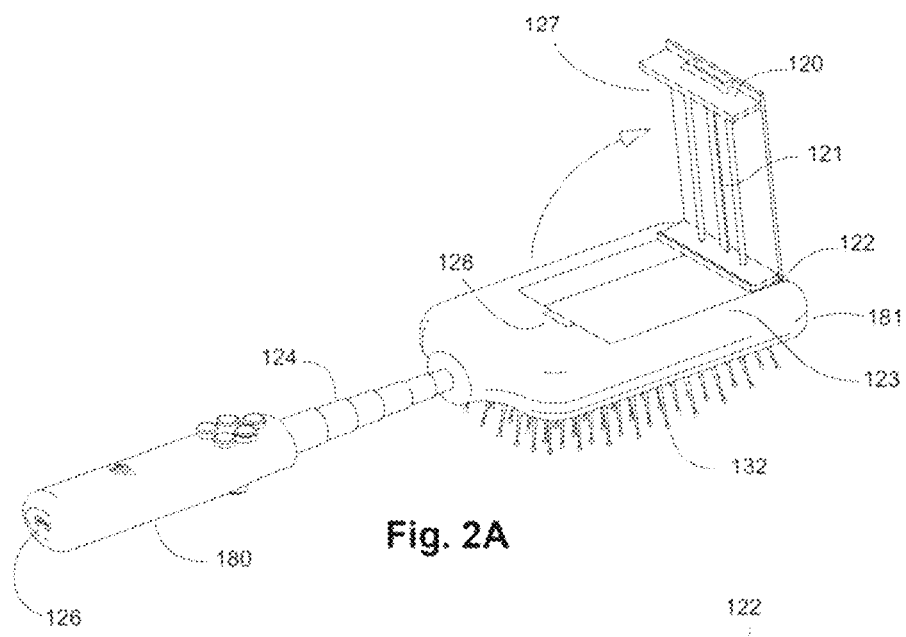
FIG. 2A is an isometric view of the backside of a smart brush of the present invention with an integrated telescoping arm and digital camera device (i.e. phone with camera) holder with a digital device clip in the open position and an integrated telescoping arm in which at least one of the embodiments is shown.
Figure 2B:
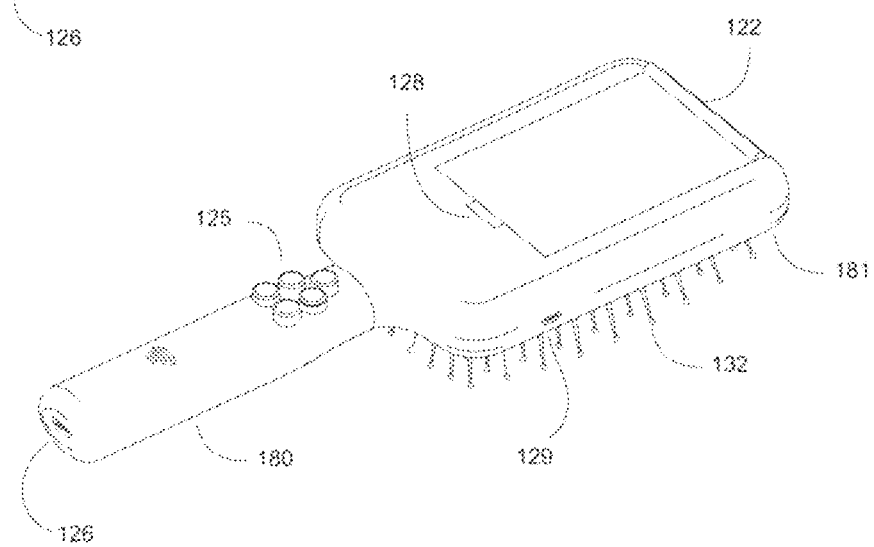
FIG. 2B is an isometric view of the backside of a smart brush of the present invention with the digital device clip in the closed position in which at least one of the embodiments is shown.

FIG. 2A shows an isometric view of the backside of a smart brush of the present invention with an integrated telescoping arm 124 and digital camera device (i.e. phone with camera) holder. FIG. 2A also shows a digital device clip 120, spring or band 121, hinge 122, pocket compartment 123, telescoping arm 124, input buttons 125, a data/power connector (i.e. USB) 126, a digital device clip 127 in the open position, a catch release button 128, a data/power connector (i.e. USB) 129, brush bristles 132, a brush handle 180, and brush head 181. FIG. 2B shows a digital device clip 127 in the closed position.

It should be understood that the person using the smart brush as previously described may be a person of any age. It is also possible for a human user to use the smart brush on a pet, animal, and child. It should also be understood that a caregiver or remote user can be any of a doctor, nurse, health care professional, family member, or any human user.

Recently it has become popular to use a smartphone or other portable digital device with a camera to take self-portraits, often called selfies. In order to take pictures from a more natural perspective a device often called a selfie stick is used, which is a rig which holds the smartphone or digital device at a distance from the user and also may include a remote. One problem that users face is that selfie sticks take up extra room in a purse or bag, and have limited functionality. FIG. 2A shows a smart brush that we will call a smart selfie brush, with a telescoping handle 124, and digital device clip 127, which makes it possible for the user to reduce the extra weight and bulk of carrying a separate selfie stick, allowing the user to take selfies at a preferred viewing angle using the brush. In one embodiment a young woman may carry a smart selfie brush in her purse. Because the brush is a standard item the woman might carry normally, the frequency of taking selfies using the brush is increased over using a traditional selfie stick. The device clip 127 may comprise a spring or elastic band 121, hinge which may be spring loaded 122, and grip bar 120. The device clip may also function as a top to a compartment 123. That compartment may be able to hold personal items 176 including earbud headphones, makeup, or medications. The compartment 123 may be opened using a snap with a release button 128. The smart selfie brush also may comprise a remote, which can instruct the connected digital device to take a picture.

Figure 3:
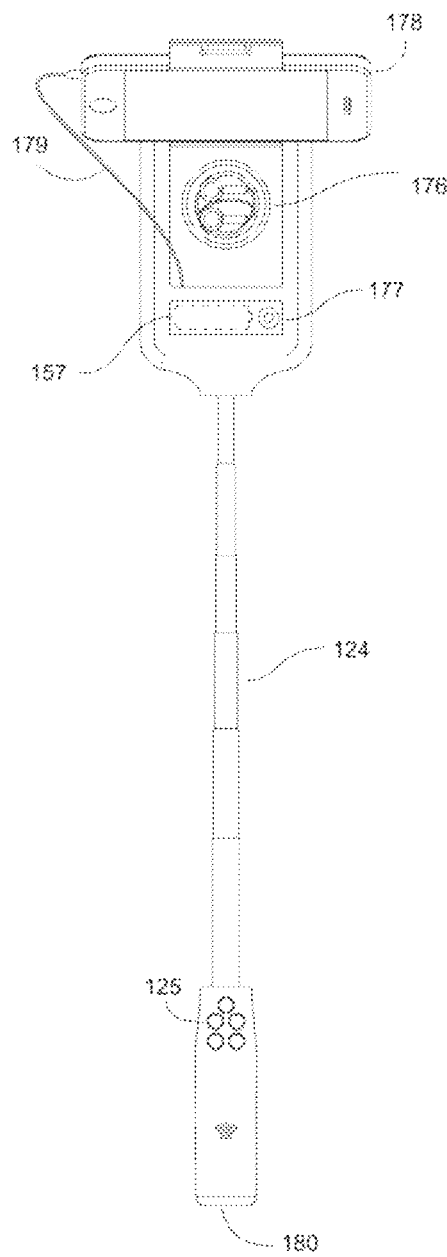
FIG. 3 is a drawing of a smart brush of the present invention showing an extended telescoping arm and digital camera device (i.e. phone with camera) holder, holding a smart phone, in which at least one of the embodiments is shown.

FIG. 3 shows a drawing of a smart brush of the present invention showing an extended telescoping arm 124 and digital camera device (i.e. phone with camera) holder. FIG. 3 also shows a telescoping pole 124, input buttons 125, a battery 157, an accessory compartment 176, a power button (i.e. on/off) 177, a digital device (i.e. phone) 178, a communications cable (i.e. headphone cable) 179, and a brush handle 180.

As shown in FIG. 3, a remote can be connected in several ways to the digital device, including using an RF signal, i.e. Bluetooth, using a physical electrical cable, i.e. headphone cable 179 or traditional cable release mechanism.

Figure 4:
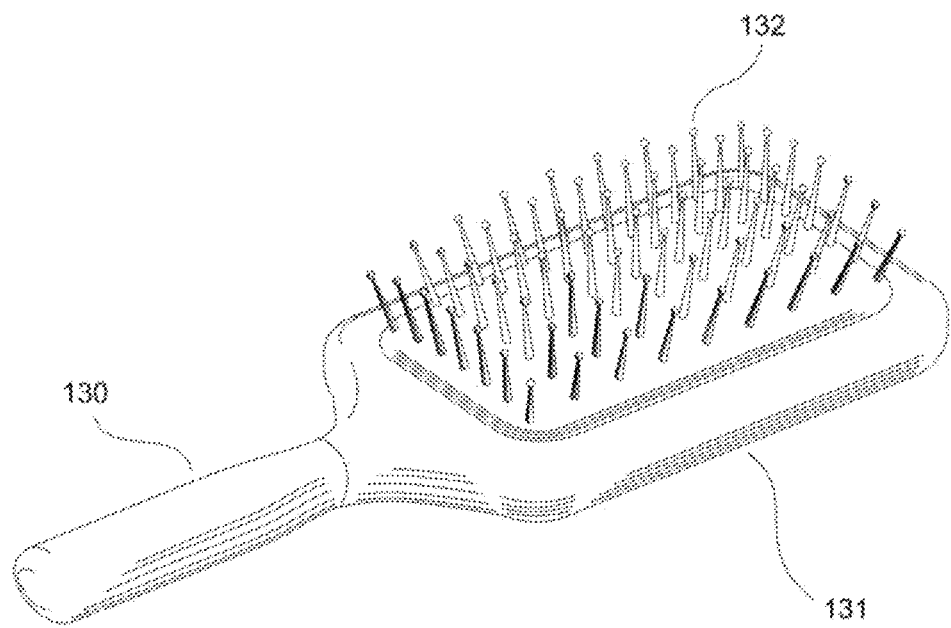
FIG. 4 is an isometric view of the front side of smart brush of the present invention in which at least one of the embodiments is shown.

FIG. 4 shows an isometric view of the front side of smart brush of the present invention. As shown in FIG. 4, in at least one embodiment, a smart brush comprises an ordinary looking hair brush, with a handle 130, a brush head 131, and bristles 132.

Figures 5A, 5B:
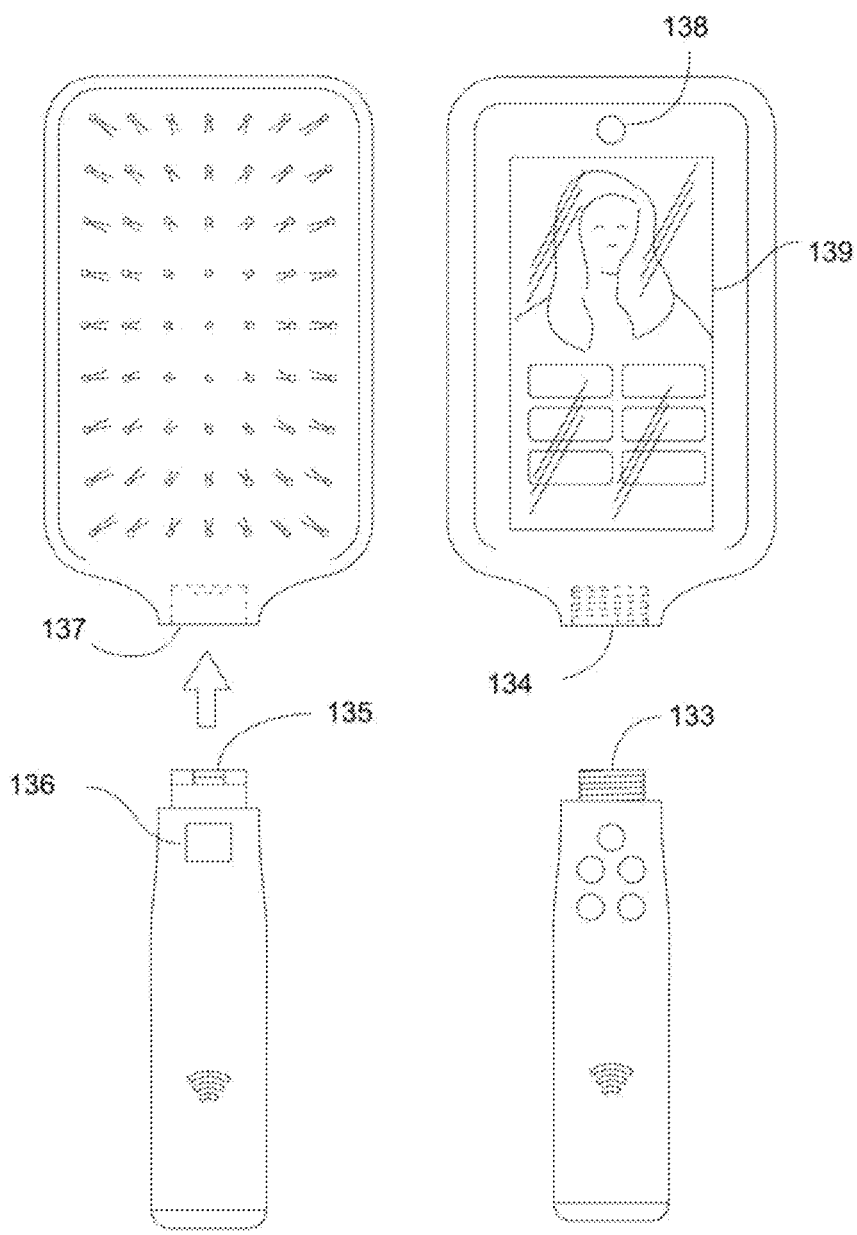
FIG. 5A is a top view of the front side of a smart brush of the present invention with a catch unit, a catch release button, and a snapping handle receptacle in which at least one of the embodiments is shown.
FIG. 5B is atop view of the backside of a smart brush of the present invention with a threaded handle connector and a threaded handle receptacle in which at least one of the embodiments is shown.

FIG. 5B shows a top view of the backside of a smart brush and the front side of a smart brush of the present invention. FIG. 5B also shows a threaded handle connector 133, a threaded handle receptacle 134, while FIG. 5A shows a catch unit 135, a catch release button 136, a snapping handle receptacle 137. Also, FIG. 5B shows a camera 138, and a display 139.

As shown in FIG. 5A and FIG. 5B, in one embodiment, a smart brush has a detachable handle. The handle is connected to the head using an attachment mechanism which may include pipe threads 133 as shown in FIG. 5B or a snapping mechanism 135 as shown in FIG. 5A. The snapping mechanism may have a male connector and a female connector, where the male connector is inserted into the female connector in order to attach the handle to the head of the smart brush. It is possible to have a catch mechanism 135, and a catch release button 136 to make it possible to quickly connect and disconnect the handle from the head.

Figures 6A, 6B:
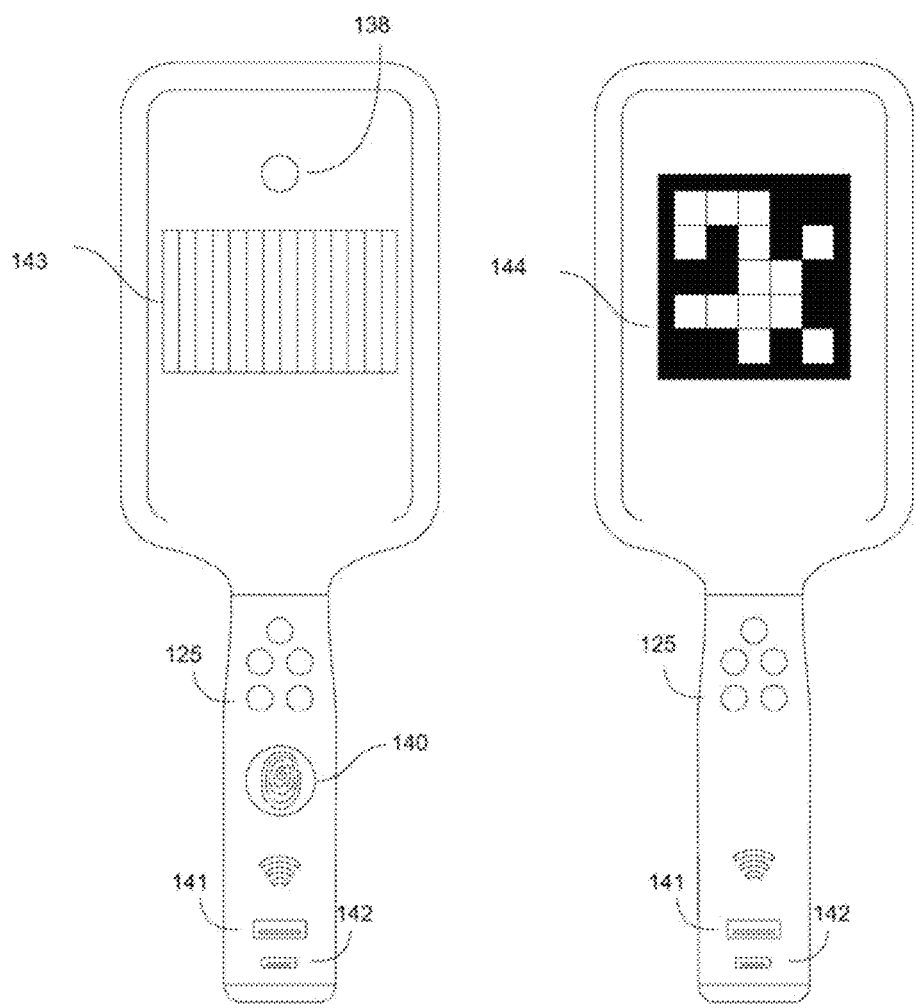
FIG. 6A is a top view of the backside of a smart brush of the present invention with an optional solar panel and fingerprint scanner in which at least one of the embodiments is shown.
FIG. 6B is a top view of the backside of a smart brush of the present invention with an optional fiducial marker in which at least one of the embodiments is shown.

FIG. 6A shows a top view of the backside of two smart brushes of the present invention. FIG. 6A also shows input buttons 125, a camera 138, a finger scanner 140, and a communications interface port 141, a power charging port 142, and a solar panel 143, while FIG. 6B shows a fiducial marker 144.

Figure 7:
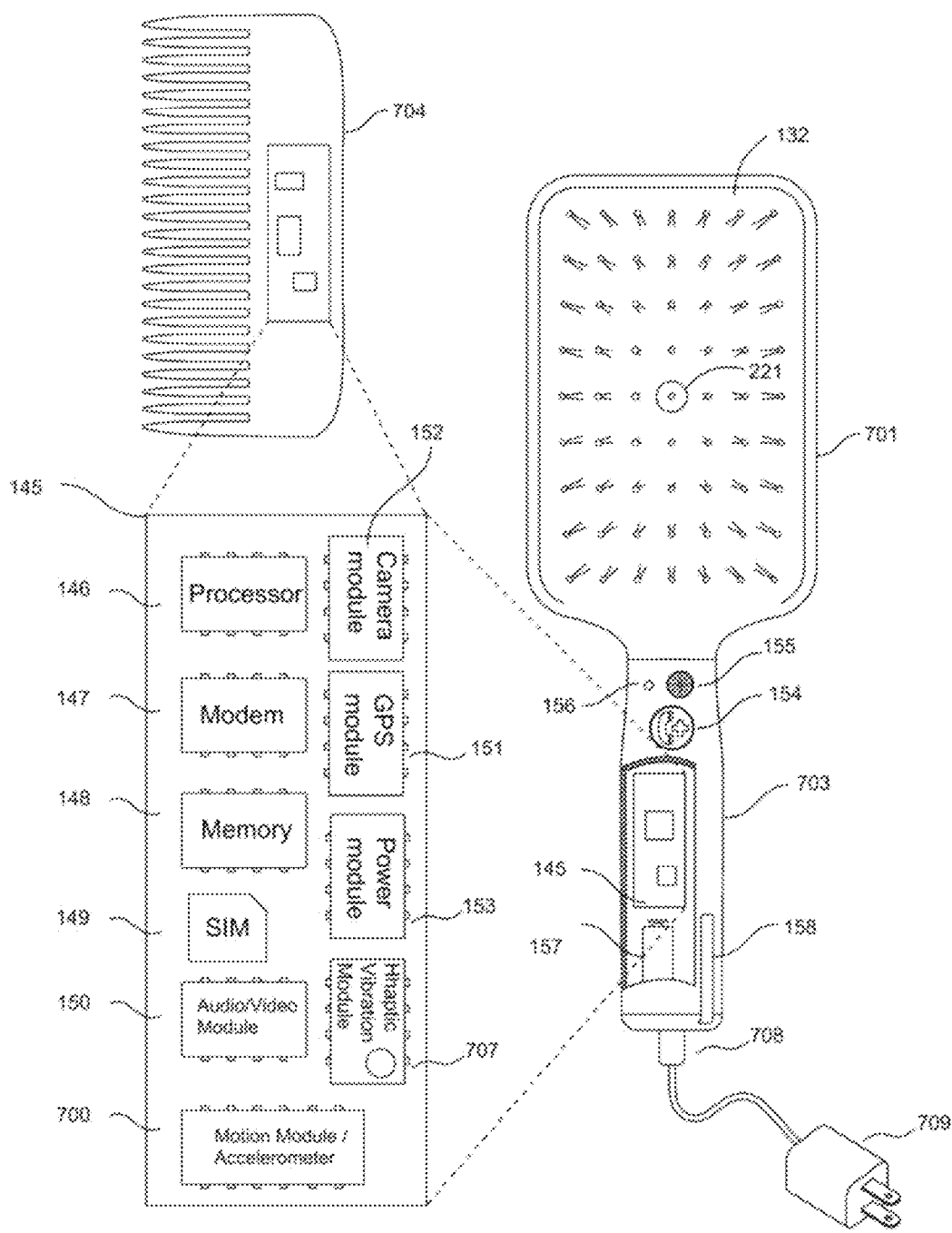
FIG. 7 is a cutaway section of the front side of a smart brush of the present invention and an alternative embodiment of a smart brush comb of the present invention along with a circuit board in which at least one of the embodiments is shown.

FIG. 7 shows a cutaway section of the front side of a smart brush of the present invention and an alternative embodiment of a smart brush comb the present invention along with a circuit board. FIG. 7 also shows a smart brush 701, bristles 132, a circuit board 145, at least one processor 146, a modem 147, a first memory location 148, a SIM card slot 149, an audio/video module 150, a motion module/accelerometer 700, a GPS module 151, a camera module 152, a power module 153, a haptic vibration module 707, a physical input button 154, a speaker 155, a microphone 156, a battery 157, an antenna 158, a motion sensor 221, a handle assembly 703, a smart comb 704, an electric cable connector, i.e. USB 708, and a power adapter charger 709.

As shown in FIG. 7, in at least one other embodiment shows a smart brush or a comb with teeth 704 and one or more of the following electronic components, a circuit board 145, at least one processor 146, a modem 147, a first memory location 148, SIM card 149, an audio/video module 150, a camera module 152, a GPS module 151, a power module 153, a motion module which may include an accelerometer 700, haptic vibration module 707, a battery 157, an antenna 158, a microphone 156, a speaker 155, and one or more interface buttons 154. The smart brush may also have its battery recharged using a power adapter charger 709. It is also possible to charge the smart brush using wireless charging, also called wireless power transfer, in which case the smart brush's power module 153, comprises a wireless charging power receiver comprising a receiving coil.

As shown in FIG. 7, because a smart brush is also a fully functional computing device which may in include a microphone 156 and speaker 155, it is possible to implement all of the functionality of modern virtual assistants, i.e. Apple's Siri, or Amazon's Alexa, including the ability to query the internet, schedule appointments on a virtual calendar, or any other routine command executable by a virtual assistant. A smart brush that plays the preferred music of the child or plays the audio version of a favorite storybook can greatly reduce the anxiety and even the pain associated with brushing hair.

Also, as shown in FIG. 7, many older people seek to live alone on their own for as long as possible; however, many people also live on their own much longer than they should. Some of the consequences of older people living on their own past when they are physically able include falling and not having someone to help them, making bad financial decisions, getting into accidents, poor nutrition, poor hygiene, and mental health issues like depression. Also, many older people who live alone past when it is safe do not themselves know when the time is to ask for more help until a serious incident occurs. There are many ways to combat this problem, but none have come up with the solution that we present in this disclosure.

FIG. 7 shows drawing of a computing device including at least one processor 145, a first memory location 148, modem 147, battery 157 and motion module i.e. accelerometer 700. As shown in FIG. 7, the smart brush may also be a fully functional computing device comprising at least one processor 146, memory 148, modem 147, battery 157 and may include physical input buttons 125, i/o ports, i.e. USB port or HDMI 126, charging port 141, as well as anything which has been shown to be included in a smart brush in this disclosure. The smart brush may also have an RF interface i.e. Wi-Fi, or Bluetooth which can connect to other wireless devices, i.e. a smartphone attached to the selfie stick using the clip 127, as shown in FIG. 2.

Figure 26:
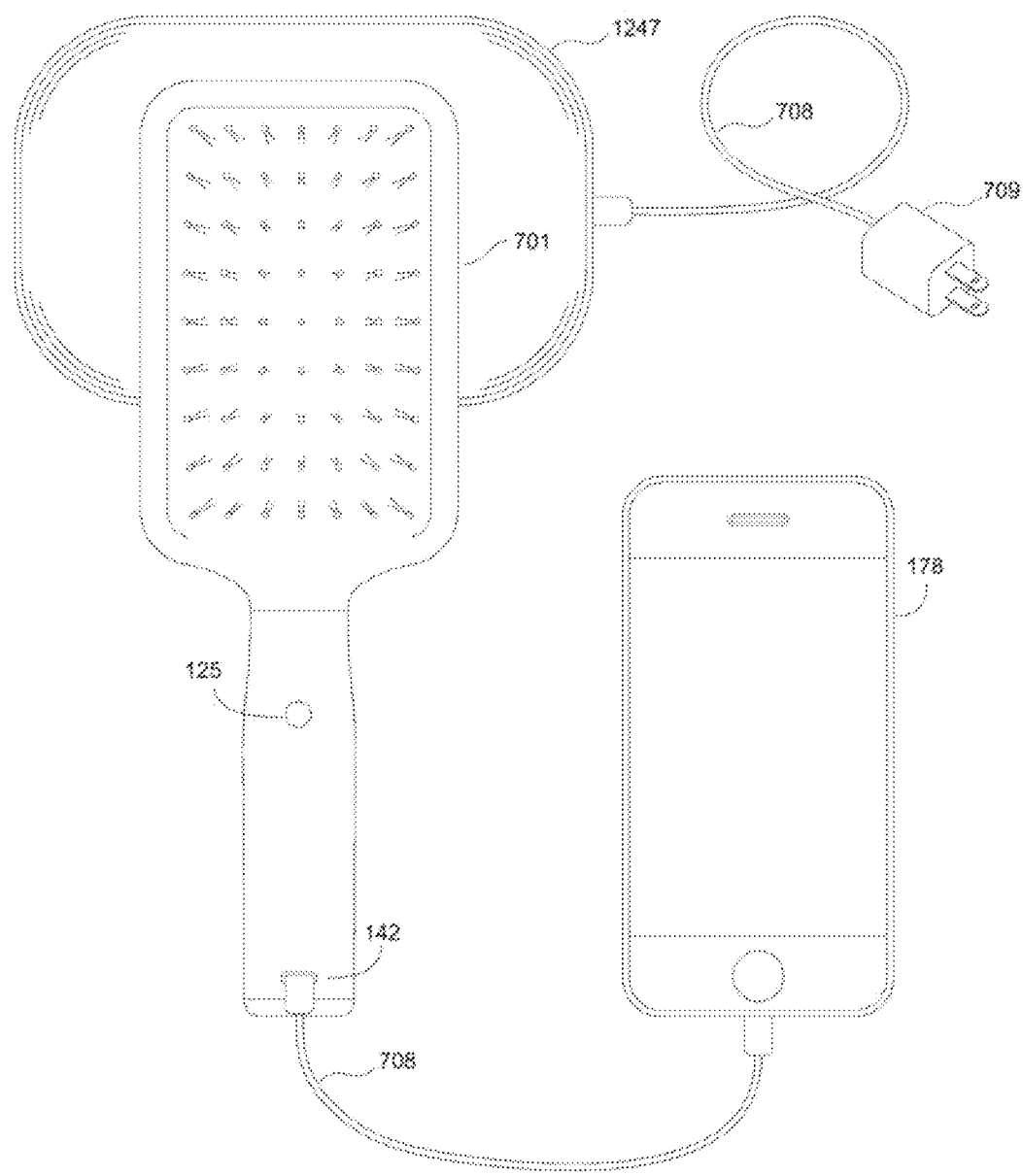
FIG. 26 is a drawing of the present invention with a smart brush connected to a digital device using an electric cable connector in which at least one of the embodiments is shown as well as a smart brush being charged using a wireless charging base station device.

As shown in FIG. 7, it is also possible to press on a physical button on the device 154 in order to send an emergency message i.e. call 911, to a dispatcher including GPS data, personal profile data, and any other data that might be necessary. It is also possible for a text message to be sent to any number of digital devices or update a social media personal profile, i.e. Facebook, or Twitter. In this way a smart brush might be able to help a user who has lost or cannot use their primary digital device when they are in distress, or otherwise need a backup digital device. Because the smart brush, in the case where it comprises bristles, functions as a hairbrush, it increases the frequency that a user will carry it with them on a regular basis, and reduces the number of items carried in a bag or purse. In the case where a user's primary digital device, i.e. a smartphone, is out of battery, it is possible to charge it up, by connecting it to the data/power connector 142 on the smart brush, as shown in FIG. 26. It is also possible to use a power adapter charger 709 to recharge i.e. wall charger with USB, the battery of the smart brush. The power adapter charger can connect to the smart brush using a cable, and can connect to the power charging port 142, as shown in FIG. 6A.

Figures 8A, 8B:
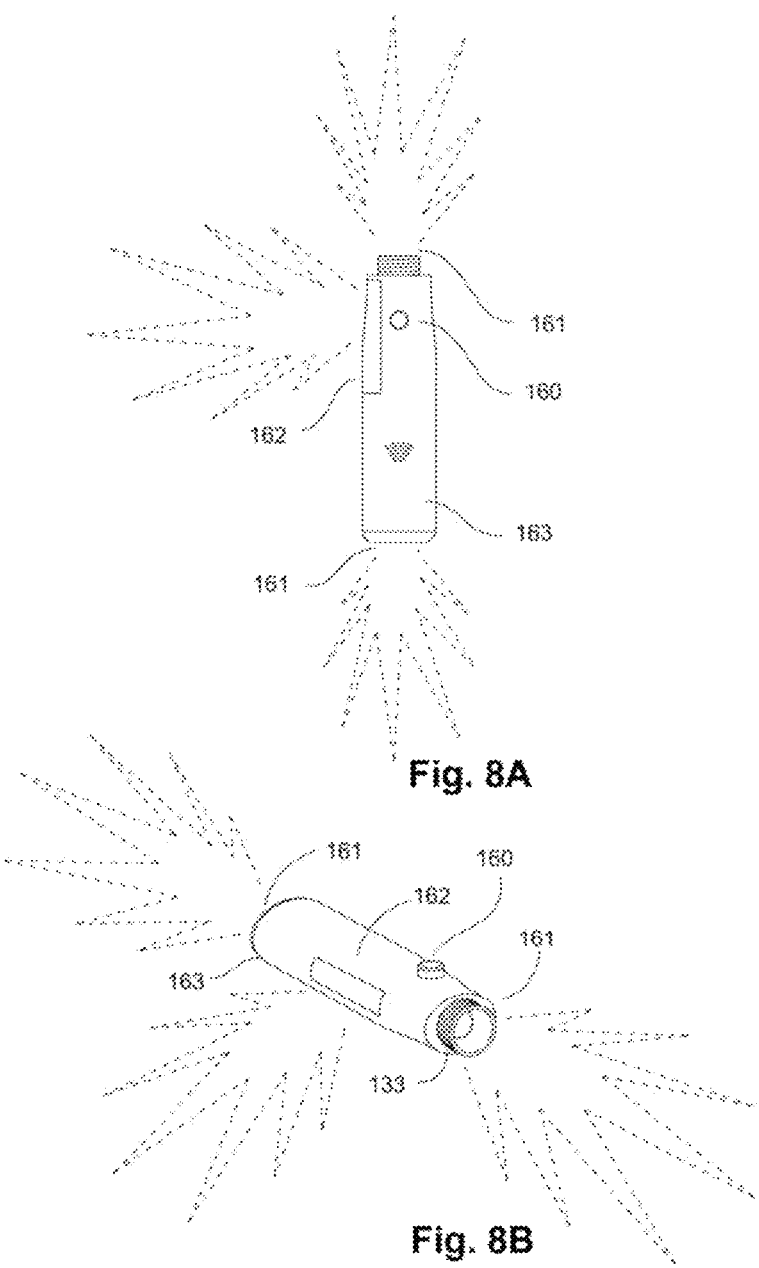
FIG. 8A is a drawing of the top view of a smart brush handle of the present invention in which at least one of the embodiments is shown.
FIG. 8B is a drawing of an isometric view of a smart brush handle of the present invention in which at least one of the embodiments is shown.

FIG. 8A shows drawing of a smart brush handle of the present invention. FIG. 8A also shows a panel light 162, an input button 160, a bright light 161, and a brush handle 163, while FIG. 8B shows a threaded connector 133.

Figure 9:
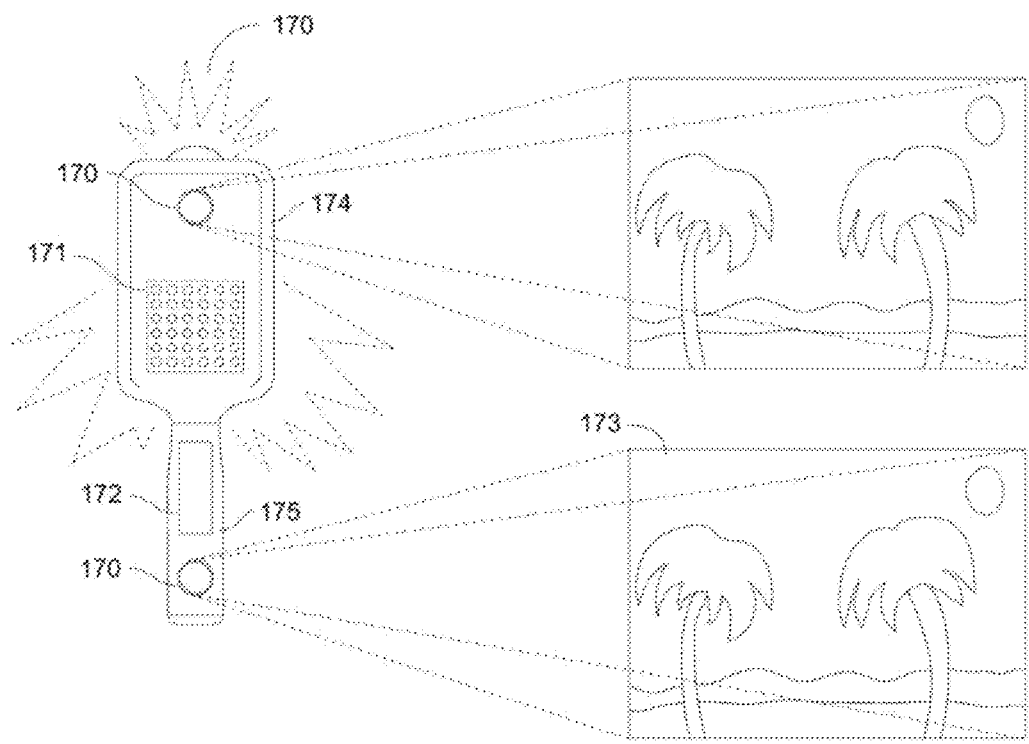
FIG. 9 is a drawing of a smart brush of the present invention with a video projector and panel light in which at least one of the embodiments is shown.

FIG. 9 shows drawing of a smart brush of the present invention with a video projector and panel light. FIG. 9 also shows a projector 170, a bright panel light 171, a touchpad 172, a brush handle 175, and a projected image 173. As shown in FIG. 9, the smart brush or smart accessory may comprise at least one light 171, including but not limited to LED lights, and as shown in FIG. 7, a speaker 155, a haptic vibration module 707, and a display 139, as shown in FIG. 5B, including but not limited to LED, LCD, OLED, or e paper/e ink, which can be used to communicate the received message.

Figure 10A:
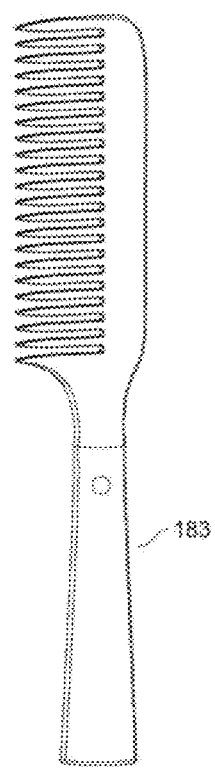
FIG. 10A is a drawing of a smart comb with a handle of the present invention in which at least one of the embodiments is shown.
Figure 10B:
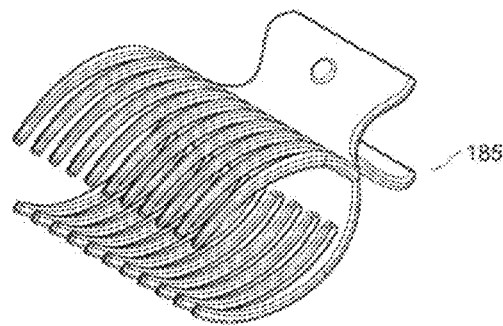
FIG. 10B is a drawing of a smart hair clip of the present invention in which at least one of the embodiments is shown.
Figure 10C:
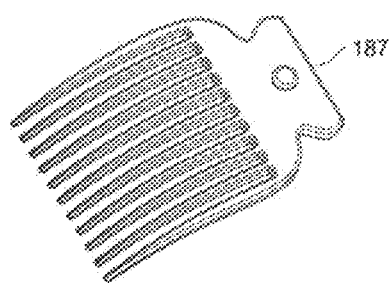
FIG. 10C is a drawing of a smart long tooth comb of the present invention in which at least one of the embodiments is shown.
Figure 10E:
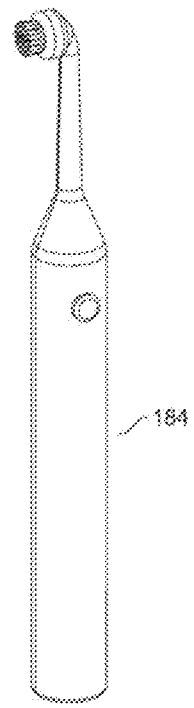
FIG. 10E is a drawing of a smart electric toothbrush of the present invention in which at least one of the embodiments is shown.
Figure 10D:
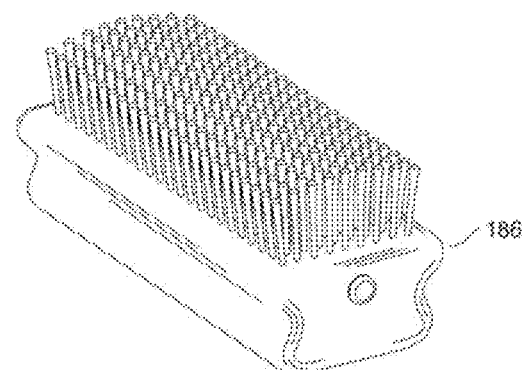
FIG. 10D is a drawing of a smart grooming brush of the present invention in which at least one of the embodiments is shown.

FIG. 10A through FIG. 10E show drawings of various accessories of the present invention. FIG. 10B shows a smart hair clip 185, while FIG. 10A shows a smart comb with handle 183, while FIG. 10E shows a smart electric toothbrush 184, while FIG. 10C shows a smart long tooth comb 187, while FIG. 10D shows a smart grooming brush 186.

Figure 11:
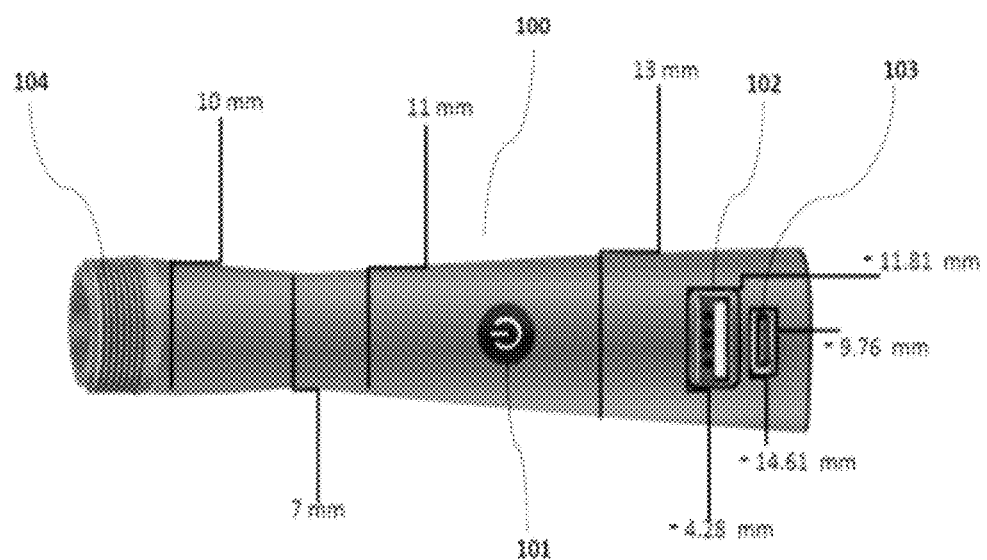
FIG. 11 is a drawing of the present invention showing a smart brush handle in which at least one of the embodiments is shown.

FIG. 11 shows drawing of the present invention showing a smart brush handle. FIG. 11 also shows a handle assembly 100, an input button i.e. on/off 101, a data/power connector i.e. USB of type A/B/C/D 102, a data/power connector i.e. USB of type A/B/C/D 103, and an external pipe thread 104.

Figure 12:
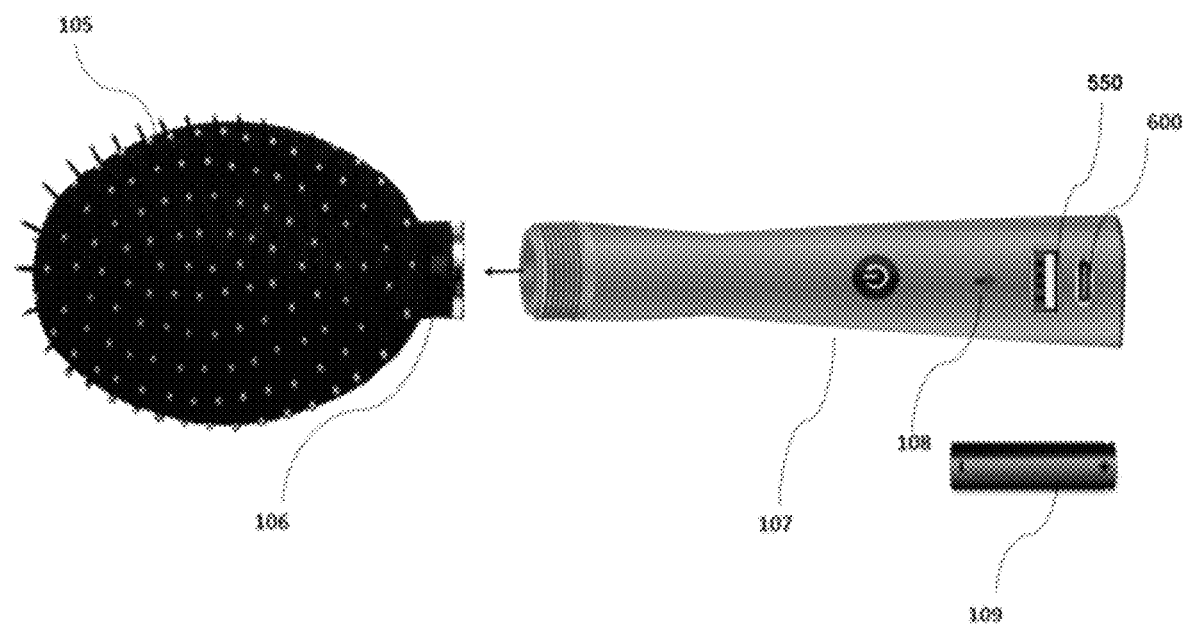
FIG. 12 is a drawing of the front side of a smart brush of the present invention in which at least one of the embodiments is shown.

FIG. 12 shows drawing of the front side of a smart brush of the present invention. FIG. 12 also shows a data/power connector i.e. USB of type A/B/C/D 550, a data/power connector i.e. USB of type A/B/C/D 600, a cushion brush 105, a mini camera 106, a handle assembly 107, a microphone 108, and a battery i.e. Li-ion/Li-polymer 109. The device shown in FIG. 12 has the following specifications: Pixel: 5.0 megapixel CMOS, Resolution: 1080P/720P/480P, Video format: AVI, Frames: 25 fps, View angle: 90 degree, Distance of motion detection shooting: 6 m straight-line distance, Minimum illumination: 1LUX, Battery capacity: 2700 mAh, Continuous shooting time: 4 hours, camera module, Compressed format: H.264, Sound recording range: 5 m, Power consumption: 260 mA/3.7V, Storage temperature: −20° C. to 80° C., Operating temperature: −10° C.-60° C., Operating humidity: 15-85% RH, Type of memory card: TF card up to 32 GB, Play software: VLC Player/SM Player, Computer operation system: Windows/Mac OS, Mobile phone operation system: Android/iOS, Web browser: IE7 and above, chrome, Firefox, Safari.

Figure 13:
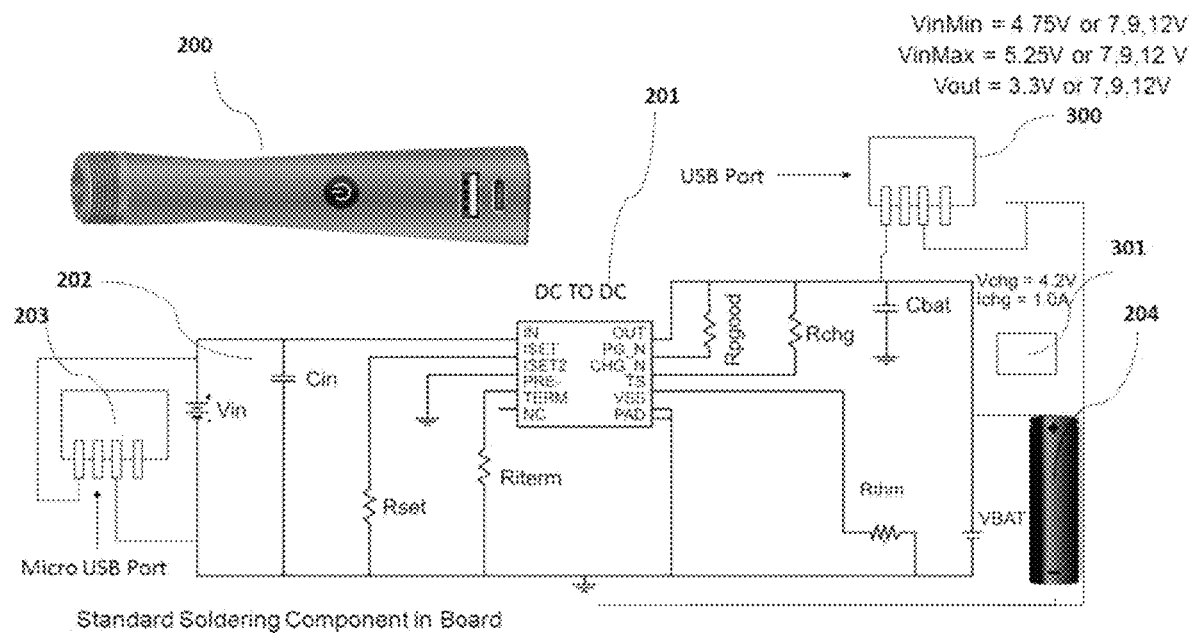
FIG. 13 is a drawing of a smart brush circuit of the present invention in which at least one of the embodiments is shown.

FIG. 13 shows drawing of a smart brush circuit of the present invention, including a handle assembly 200, a DC to DC converter or controlled current flow 201, a circuit board 202, a micro USB i.e. type A/B/C/D 203, a battery i.e. Li-ion/Li-polymer 204, a USB port i.e. type A/B/C/D 300, an input button i.e. on/off 301, and circuit board that may comprise filters, resistors, transistors, sensors, two USB ports, power, data input/output, DC to DC module, and a battery 202.

Figure 14:
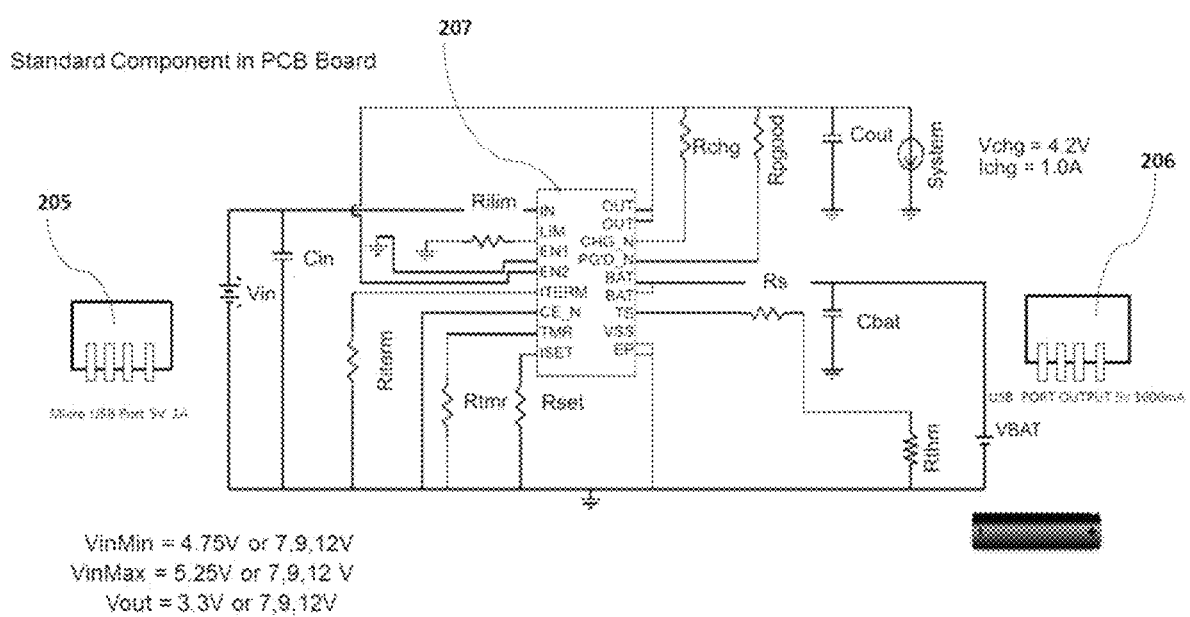
FIG. 14 is a drawing of a printed circuit board (PCB) of the present invention in which at least one of the embodiments is shown.

FIG. 14 shows drawing of a printed circuit board (PCB) of the present invention. FIG. 14 also shows a micro USB port AB/C/D 205, a USB port type A/B/C/D 206, and a circuit board that may comprise filters, resistors, transistors, sensors, RS, COUT, Rilim, Rset, Cbat, Cin, Rthn, Riterm, Rtmr, U1, Rchg Rpgood, USB port i.e. power input/output, DC to DC module, and a battery 207.

Figure 15:
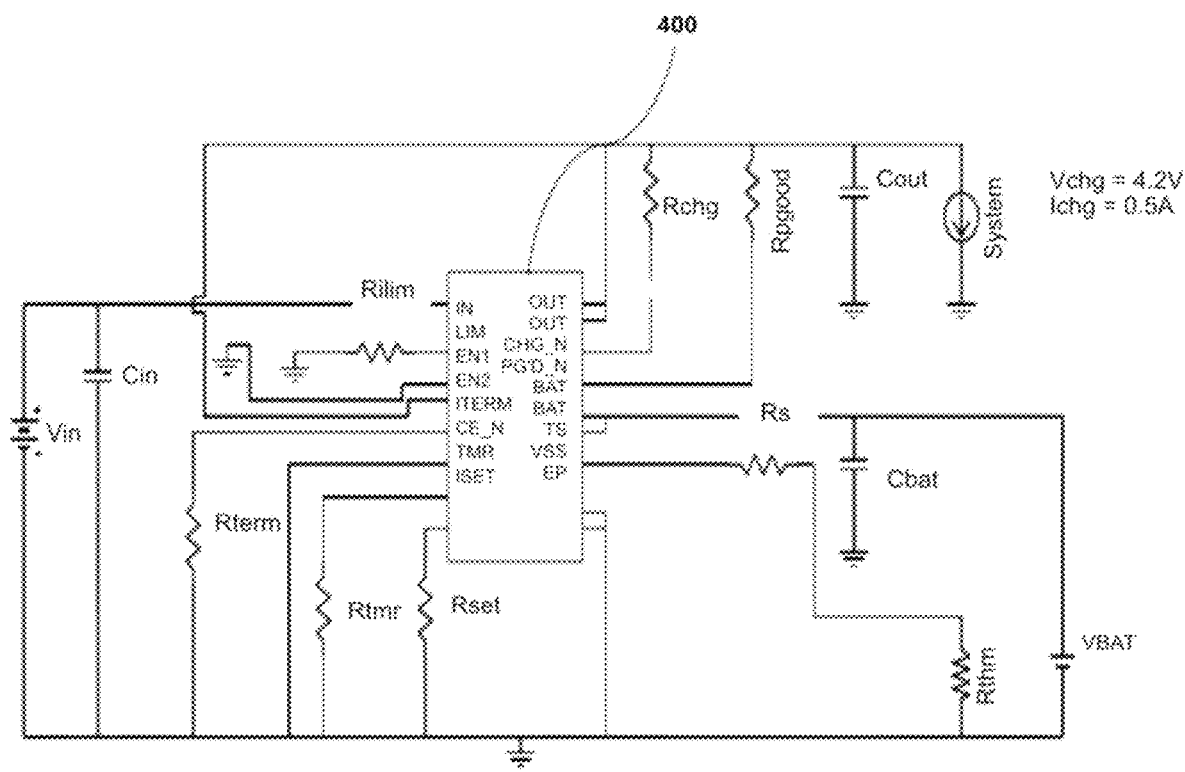
FIG. 15 is a drawing of a smart brush circuit of the present invention in which at least one of the embodiments is shown.

FIG. 15 shows drawing of a smart brush circuit of the present invention. FIG. 15 also shows a circuit board that may comprise filters, resistors, transistors, sensors, RS, COUT, Rilim, Rset, Cbat, Cin, Rthn, Riterm, Rtmr, U1, Rchg Rpgood, USB port i.e. power input/output, DC to DC module, and a battery 400. The device shown in FIG. 15 has the following specifications: Fully Compliant USB Charger, Selectable 100-mA and 500-mA Maximum, Input Current, 100-mA Maximum Current Limit Ensures, Compliance to USB-IF Standard, Input-based Dynamic Power Management, (VIN-DPM) for Protection Against Poor USB Sources, 28-V Input Rating With Overvoltage Protection, Integrated Dynamic Power-Path Management, (DPPM) Function Simultaneously and Independently Powers the System and Charges the Battery, Supports up to 500-mA Charge Current With Current Monitoring Output (ISET), Programmable Input Current Limit up to 500 mA, Programmable Termination Current, Programmable Precharge and Fast-Charge Safety Timers, Reverse Current, Short-Circuit, and Thermal Protection, NTC Thermistor Input, Proprietary Start-Up Sequence Limits Inrush Current, Status Indication-Charging/Done, Power/Good, Small 3 mm×3 mm 16-Lead QFN Package, APPLICATIONS, Bluetooth™ Devices, Low-Power Handheld Devices, and Cell Phone, Other.

Figure 16:
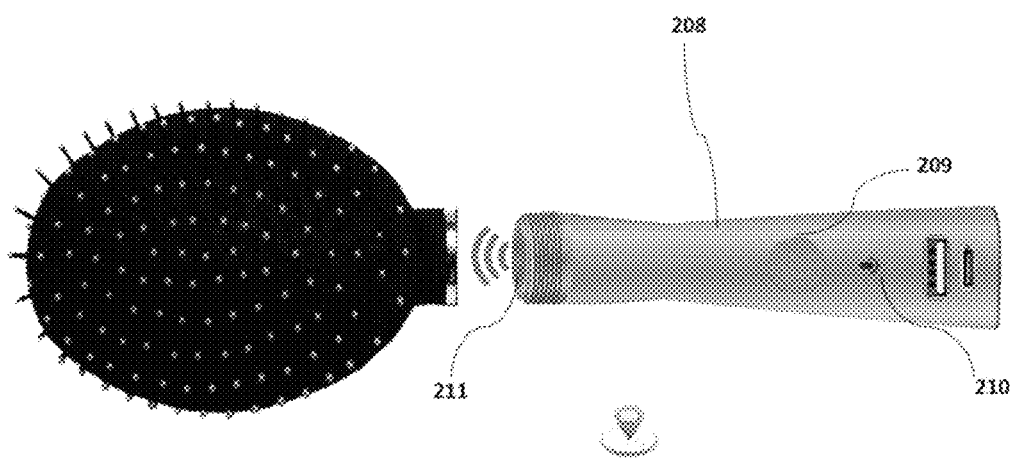
FIG. 16 is a drawing of the front side of a smart brush of the present invention in which at least one of the embodiments is shown.

FIG. 16 shows drawing of the front side of a smart brush of the present invention. FIG. 16 also shows a handle assembly 208, an input button i.e. emergency call button to call emergency services 209, and a microphone i.e. for two way calling 210. The device shown in FIG. 16 has the following specifications: With the smart brush mini GPS Tracker & SOS Alarms, you have access to help when you need it most. The smart brush includes a roaming SIM, making sure you have round-the-clock help. The smart brush GPS Tracker is a personal safety device with a large button on the front that keeps you connected with loved ones or emergency services. It is possible to use the handle detached from the brush head, which can be attached with a lanyard to wear around the neck or wrist for quick use. TWO-WAY VOICE: As well as being a GPS locator, a smart brush unit is also a fully functioning mobile phone unit. You can designate numbers that the brush tracker can contact and it is also possible to view the smart brush's location remotely. GPS LOCATION-LIVE SERVICES: If you want to know where the tracker is, just view it on the Web or a mobile client app (i.e. Android or iOS). It is also possible to send a text message location request, and the brush sends its location back to your smartphone via text.

Figure 17A:
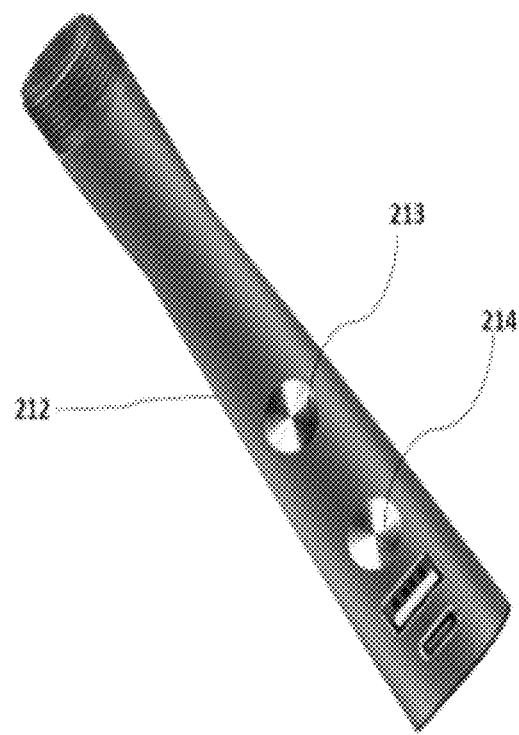
FIG. 17A is a drawing of the front side of a smart brush handle of the present invention with various accessories in which at least one of the embodiments is shown.
Figure 17B:
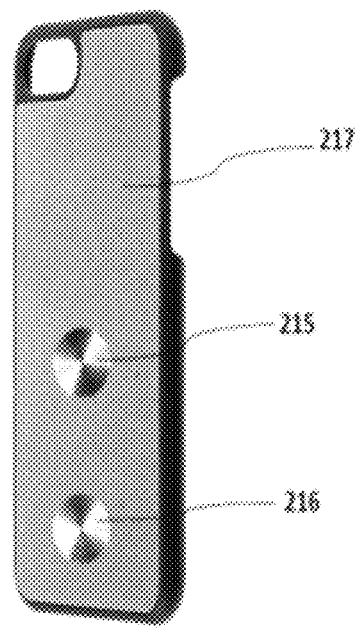
FIG. 17B is a drawing of the back side of a phone case of the present invention with various accessories in which at least one of the embodiments is shown.

FIG. 17A shows drawing of the front side of a smart brush handle and FIG. 17B is a phone case of the present invention with various accessories. FIG. 17A also shows a handle 212, magnets with DC current flow 213 and 214, while FIG. 17B shows magnets 215 and 216, and a cell phone cover 217.

FIG. 18A through FIG. 18D show drawings of a smart brush with various brush head attachments of the present invention. FIG. 18C also shows a round brush i.e. with greater airflow reducing drying time 500, a medium round brush i.e. with heat resistant bristles with soft-tips 501, a little round brush 502, a rectangular brush 503, while FIG. 18D shows a handle 504. As shown in FIG. 18C, one of the advantages of this design is it is possible to have multiple types of brush heads, including different sized round 500, 501, 502 and rectangular types 503. FIG. 18A shows a brush with a handle 218, while FIG. 18B shows a brush with a disconnected head 219 from the handle with power button 220.

Figure 19:
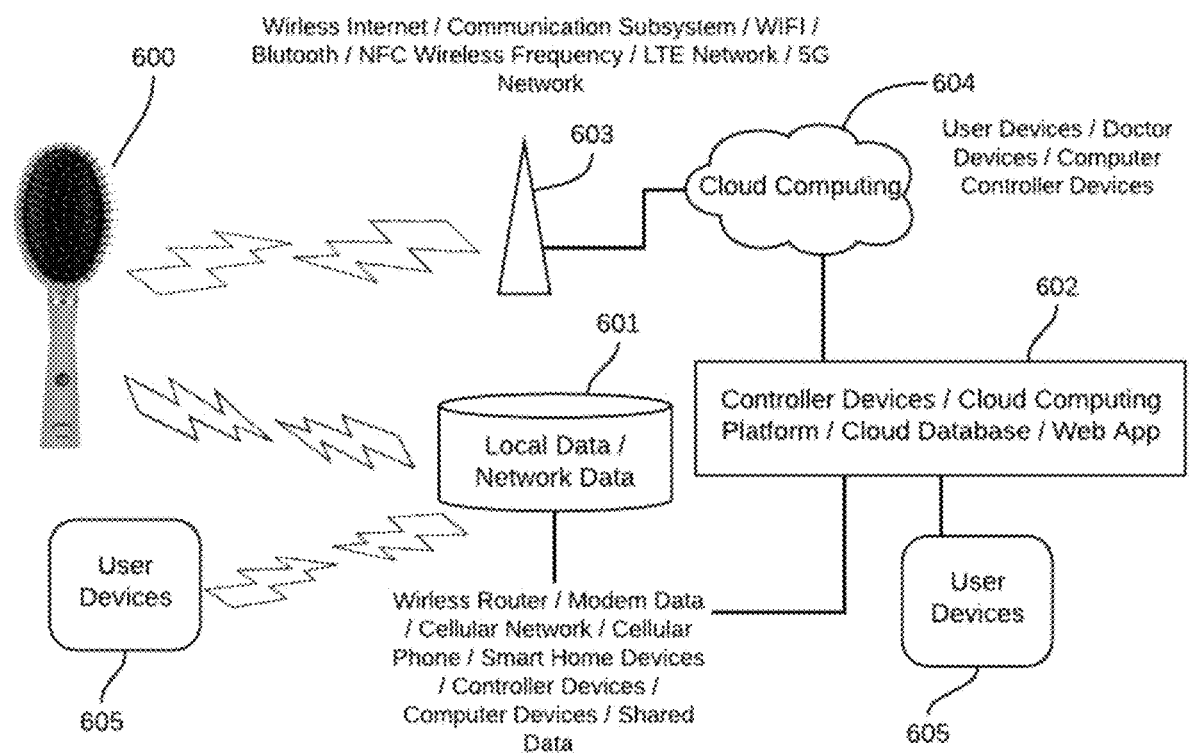
FIG. 19 is a diagram of a connected network of digital devices for information transmittal from the present invention in which at least one of the embodiments is shown.

FIG. 19 shows a diagram of a connected network of digital devices for information transmittal. FIG. 19 also shows a smart brush connected to any wireless data network i.e. LTE (Long-Term Evolution), 5G generation mobile networks, 4G, global System for Mobile Communication (GSM), General Packet Radio Services (GPRS), Enhanced data GSM Environment standards (EDGE), Universal Mobile Telecommunications Service (UMTS), Code Division Multiple Access (CDMA), CDMA2000 networks, 802.11, Mobitex™, personal Communication Systems (PCS), time Division Multiple Access (TDMA), all wireless communication standard WI-FI, Bluetooth, and NFC wireless frequency 600, a Local network i.e. smart home network 601, a controller devices, cloud computing platform, cloud database, web APP and middleware 602, a wide area wireless network 603, a cloud computing system 604, and users' computing devices 605.

As shown in FIG. 19, some configurations allow the smart brush to connect to a network 601, including a local network and the internet, and have the ability to send and receive data, either input, i.e. button presses, or other inputs or user commands, or passive data, including usage data of the smart brush by the user. Within this disclosure it should be understood that a smart brush may be any number of different types of grooming accessories which include electronic components and have bristles or teeth, i.e. a hair brush, including soft or hard bristles, a comb, and brushes and combs used for grooming of animals as well as humans. Finally, some additional accessories which also include bristles or teeth will be described that also may have some similar functionality to the smart brushes described in this disclosure and also include electronic components but are not brushes for hair, i.e. toothbrushes and hair clips. However, it should be understood that the term "smart brush" can be used for all of these devices described or shown in figures.

Also, as shown in FIG. 19, the smart brush may be implemented in the context of a smart home or other network connected environment including a local wireless network or wide area wireless network, including wireless broadband network 603, and may be connected to other devices in the network in order to form a connected system in which the smart brush can be used.

As shown in FIG. 19, it is also possible to have the smart brush connect to a local 601 or wide area 603 wireless network in order to download music from a server or cloud network 602, 604. In this case it would be possible for the smart brush to be programmed in order to be able to have one or more user accounts, in such a way that a user could quickly access her music streaming service, with the smart brush allowing the user to login to that music streaming service using the smart brush as the computing device interface for the service, i.e. Spotify, or Amazon Prime Music. It is also possible for the smart brush to be implemented as a smart home device such that it can receive voice commands via a built-in microphone 156, transmit the commands to a server or cloud network 602, 604, have the commands interpreted and executed by an intelligent agent, in such a way that the brush can act as a fully functional virtual assistant, similar to Amazon Echo, or Google home.

When the older person, shown in FIG. 1, uses the smart brush, usage data is automatically collected 603, as shown in FIG. 19. As shown in FIG. 7, one version of the smart brush comprises a smart hair brush with a motion sensor 221, which is activated by movement of the bristles of the brush, such that a detection by the sensor is sent to the motion module 700, and the detection data is at least one of saved in a first memory location 148 or transmitted to a remote server or cloud network 602, 604 as shown in FIG. 19.

Also, as shown in FIGS. 7 and 19, another version of the smart brush comprises an accelerometer 700, which when activated by movement of the body of the smart brush, a detection is automatically generated, which is at least one of stored in a first memory location 148 or directly sent to a local network 601, wide area network, or to a cloud network 602, 604. Other metadata including time of use, duration of use, and directional information can be recorded from the smart brush. The data may be stored using middleware running on a server 602, 604, which may include a graphical user interface, backend database, a network switch, and server hardware. The middleware software comprises a personal profile, which may include basic information about the user, including their name, their age, contact information as well as a machine learning model 609 which has been trained to understand the user's daily routine.

Figure 20:
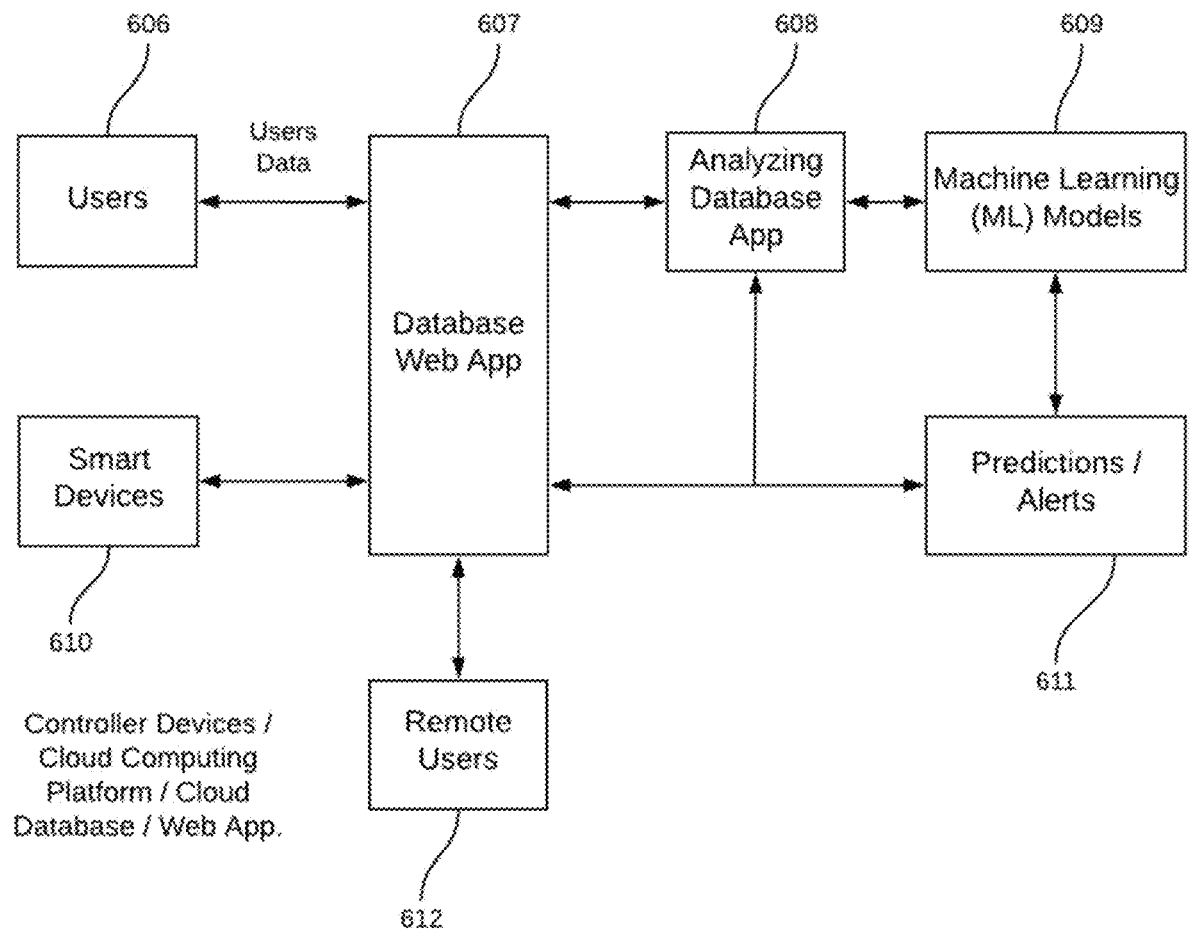
FIG. 20 is a drawing of a smart brush and smart accessory network of the present invention in which at least one of the embodiments is shown.

FIG. 20 shows drawing of a smart brush and smart accessory network of the present invention. FIG. 20 also shows a user 606, database web application 607, analyzing database application 608, machine learning models 609, smart devices 610, predictions and alerts 611, remote users 612. As shown in FIG. 20, using the system and methods of this invention it is possible to capture and analyze detailed data on an older person's daily routine 607.

The machine learning model is created using at least one of supervised learning, unsupervised learning, or reinforcement learning. The model is trained using personal profile data which may include usage data of a smart brush. In the case of supervised learning, label data may comprise key health indicators including mental health and physical health. The labels may also include serious incidents like a fall or other accidents, or any other indicator events, i.e. missed appointments or a reduction of physical movement. Personal profile data may be collected from any number of smart accessories and smart appliances, including but not limited to a network connected stove, refrigerator, door locks, vacuum cleaner, lawn mower, television, camera, smart shoes, smart watch, and smartphone. The goal of training the machine learning model is to generate a usable machine learning model which can predict at least one of the mental or physical health of the user. Using classification, a machine learning method, it may also be able to predict a simple binary, at least one of whether or not the user should be living on their own or not or whether an intervention is necessary or not. Using regression, a machine learning method, the machine learning model may be able to indicate the likelihood of a negative life event occurring including but not limited to a physical fall, a decline in brain functionality, or the onset of depression. It is also possible to use other types of output which may aid in understanding the health and well-being of the user. Some of the types of machine learning that may be used include, decision tree learning, association rule learning, artificial neural networks, deep learning, inductive logic programming, support vector machines, clustering, Bayesian networks, reinforcement learning, representation learning, similarity and metric learning, sparse dictionary learning, genetic algorithms, rule-based machine learning, learning classifier systems. Other types of machine learning may also be used.

As shown in FIG. 20, the middleware software 608 may also comprise at least one of an analysis software module and a messaging software module, and an intelligent agent capable of Automatic Speech Recognition. The analysis software module can be configured to allow for at least one of caregivers and users to review the personal profile data of the older person, as well as generate reports. The messaging software module allows for at least one of users and caregivers to set up alert messages which will be sent via at least one of email, text message, and message sent to a smart home device, when certain data triggers have been triggered. The message may contain a recommendation for action, including at least one of reviewing the personal profile information, contacting the older person, contacting a caregiver, and a reminder to the older person to use their smart brush. A message sent from the messaging software module can be sent directly to the smart brush.

As shown in FIG. 20, the analysis software module 608, may be configured to receive predictions 611 from the machine learning model, and may be configured to respond to the predictions sent from the machine learning model by at least one of updating a report, triggering a software trigger, sending a message to at least one of a remote user 612, caregiver, or the older person.

Also, as shown in FIG. 20, in one embodiment, an older user uses a smart brush as part of their daily routine. Usage data is sent from the smart brush to middleware 607, 608 which may be a web app, or other type of application running on a server or cloud network comprising a personal profile. The usage data is sent to an analysis software module 608 which includes a machine learning model 609 which receives the usage data. Predictions are then sent back from the machine learning model 611, which are interpreted by the middleware 607, 608. If necessary alerts or other messages are sent from the middleware to a remote user 612, or the older user 606. It is also possible to send messages to other network connected devices 610, i.e. a smart speaker including a virtual assistant.

As shown in FIG. 19, it is also possible for the smart brush to connect directly to a local wireless network 601, or a wide area wireless network 603, including but not limited to a cellular phone network, or broadband internet network. In one embodiment, using input buttons on the smart brush, a user can take a selfie using a connected digital device with a camera, i.e. a smart phone, and have the image sent to a remote web app, i.e. Instagram or Facebook, using only one press of a button. The input buttons on the smart brush can be configured using software to trigger the digital device connected using the digital device clip, as well as instruct the digital device to upload any of a photo, video, live video, and video on demand to a desired location on a network. It is also possible to use a smart brush comprising an integrated digital camera, to take pictures or video, including selfies, and have them uploaded directly to a server on a network, i.e. web app.

It is known that the deterioration of daily hygiene and personal care is a key indicator of other more serious problems that an older person might face. In at least one embodiment of the present invention, a computer-implemented method is used for predicting a negative life event, including the onset of a disease, such as the onset of dementia, a change in the user's mobility or ability, the onset of depression, or another medical event by using hair grooming data. This computer-implemented method generates with at least one processor, an initial usage data model from a specialized styling device based on inputted information. The initial usage data model comprises a machine learning model. The inputted information is based on recommendations by a caregiver and users' daily routines. The initial usage data model is then stored on a cloud based computer.

Next, at least one processor generates a user's actual usage data of a specialized styling device, by measuring a user's pattern of use of the specialized styling device. The specialized styling device is selected from a group consisting of a brush, comb, hair clip, toothbrush, and a brush for pets and animals.

Next, the user's actual usage data is stored in a first memory location. The user's actual usage data is then received and stored in a remote second memory location in a cloud based computer.

Next, a prediction is generated based on analyzing, with at least one processor, the user's actual usage data using the initial usage data model stored on the cloud based computer. After that, an alert command may be transmitted to the specialized styling device that will activate a notification indicator on the specialized styling device if the prediction indicates that the chances of a negative life event may be likely. The notification indicator may comprise an indicator light, digital display, speaker, or haptic vibration module. Also, a signal may be transmitted to a caregiver if the prediction indicates that the chances of a negative life event may be likely.

The specialized styling device, comprises an enclosure body with a plurality of bristles used for manipulating a user's hair and at least one or more of the following: a circuit board, processor, modem, memory, SIM, SIM card slot, audio/video module, motion module/accelerometer, speaker, microphone, antenna, power module, data/power connector used for charging either a digital device or another device, and transmitting data, a notification indicator, and a battery used for storing an electrical charge. The notification indicator may comprise an indicator light, digital display, speaker, or haptic vibration module. The specialized styling device may be a brush, comb, or hairclip. The specialized styling device may also include a detachable handle, a finger scanner, a solar panel, a power module for wireless charging, necessary components in order to play music, a digital camera, a personal electric generator used for charging up the specialized styling device, a communications jack for a headphone cable, a physical input button, and a panel light.

FIG. 21A shows drawing of the front side of a pocket smart brush with retractable bristles in the closed position, while FIG. 21C shows the retractable bristles in the open position of the present invention. FIG. 21A also shows a pocket smart brush with retracted bristles 1206, while FIG. 21C shows a pocket smart brush with bristles popped up 1207, and a data/power connector i.e. USB 1224.

FIG. 21B shows drawing of the backside of a pocket smart brush with a slider button to retract the bristles of the present invention. FIG. 21B also shows a pocket smart brush 1201, retractable bristles 1202, a mechanical slider button 1203, a brush back wall slot 1204, and a handle 1205.

Figures 22A, 22B, 22C, 22D, 22E, 22F:
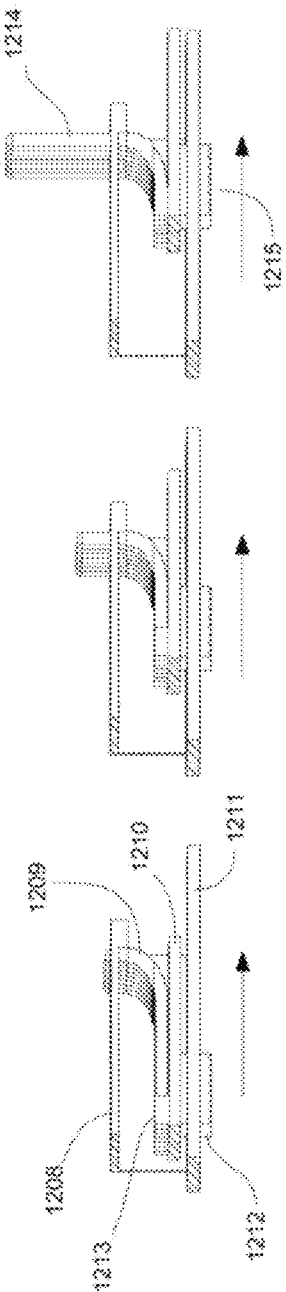
FIG. 22A is a drawing of the cross section of the pocket smart brush, showing the flexible bristle design of the present invention in a fully retracted position in which at least one of the embodiments is shown.
FIG. 22B is a drawing of the cross section of the pocket smart brush, showing the flexible bristle design of the present invention in a partially retracted position in which at least one of the embodiments is shown.
FIG. 22C is a drawing of the cross section of the pocket smart brush, showing the flexible bristle design of the present invention in a fully extended position in which at least one of the embodiments is shown.
FIG. 22D is a drawing of the cross section of the pocket smart brush, showing the hinged bristle design of the present invention in a fully retracted position in which at least one of the embodiments is shown.
FIG. 22E is a drawing of the cross section of the pocket smart brush, showing the hinged bristle design of the present invention in a partially retracted position in which at least one of the embodiments is shown.
FIG. 22F is a drawing of the cross section of the pocket smart brush, showing the hinged bristle design of the present invention in a fully extended position in which at least one of the embodiments is shown.

FIG. 22A shows drawing of the cross section of the pocket smart brush, showing the flexible bristle design of the present invention. FIG. 22A also shows a brush face wall 1208, a bristle guide 1209, a button slider plate 1210, and a brush back wall 1211, a mechanical slider button 1212, a bristle root 1213, while FIG. 22B shows a midway position, and FIG. 22C shows a bristle 1214, and a slider button in "up" position 1215.

FIG. 22D shows drawing of the cross section of the pocket smart brush, showing the hinged bristle design of the present invention. FIG. 22D also shows a brush face wall 1216, a bristle 1217, a bristle root 1218, a female joint connector 1219, a male joint connector 1220, a button slider plate 1221, while FIG. 22E shows a midway position, and FIG. 22F shows a mechanical slider button in "up" position 1222, and a bristle 1223.

As shown in FIG. 21C, in one embodiment, a brush has retractable bristles. The bristles are popped up using a mechanical slider button 1203. When the mechanical slider is pushed into the "up" position, the bristles are popped up. When the mechanical slider button is in the "down" position, the bristles are retracted. This type of brush is referred to herein as a pocket brush, because when the bristles are retracted it is convenient to carry it in a pocket. As shown in FIG. 22D, a pocket brush comprises a hollow body including a front brush face wall 1208 and a back brush face wall 1211. The front brush face wall comprises holes for the bristles. The back face comprises a slot opening 1204 for the slider button to slide up and down. In one embodiment the mechanism which deploys and retracts the bristles comprises a button plate 1210 which is coupled with flexible bristles 1214. When the slider button plate is pushed into the "up" position, each of the flexible bristles is pushed up into a hole in the brush face wall along a path determined by a guide 1209, i.e. a guide tube.

As shown in FIG. 22D, alternatively it is possible to use another type of mechanism, using hinged bristles, to deploy the bristles in a pocket brush. A pocket brush with hinged bristles comprises a bush face wall 1216 with holes for the bristles, bristles 1217 hingedly connected to a button slider plate, a button slider plate 1221 which can move up and down, and a brush back wall with a slot opening for the slider button 1218. It is also possible to make the pocket brush smart similarly as has been described in the disclosure. In this disclosure, this pocket brush, which is smart, is referred to as a smart pocket brush. In one embodiment a smart pocket brush comprises a data/power connector i.e. USB and a battery. A smart pocket brush is also a smart brush which can operate similarly as any of the smart brushes described in this application and may comprise any number of features, components, or modules described herein.

FIG. 23A shows drawing of a smart travel pop-up design of the smart brush in the closed position of the present invention. FIG. 23A also shows a speaker 1332 and a data/power connector, i.e. USB 1225.

FIG. 23C shows drawing of a smart travel pop-up design of the smart brush in the open position with the bristles not popped-up of the present invention. FIG. 23B also shows a data/power connector, i.e. USB 1225, a popup flexible brush face i.e. rubber 1226, a popup brush face housing 1227, bristles 1228, a hinge 1229, a mirror or digital display 1230, and a brush face cover 1231.

As shown in FIG. 23B, in another embodiment a brush is able to be folded up easily for traveling comprising a pop-up flexible brush face 1226 i.e. rubber, bristles 1228, a hinge 1229 and may comprise a mirror or digital display 1230. This type of brush is often called a travel pop-up brush. We present a smart travel pop-up brush comprising a data/power connector 1225, i.e. USB or HDMI and a battery and may also comprise any of the components, features, and functionality of any smart brush presented in this disclosure. In one embodiment, the smart travel pop-up brush comprises a RF modem capable of communicating using Bluetooth or Wi-Fi, at least one processor, and a speaker 1332, allowing for users to play music. It is also possible to stream music from a digital device, i.e. smart phone to the smart travel pop-up brush.

FIG. 23C shows drawing of a smart travel pop-up design of the smart brush in the open position with the bristles popped-up of the present invention. FIG. 23C also shows a data/power connector, i.e. USB 1225, a popup flexible brush face i.e. rubber 1226, a popup brush face housing 1227, bristles 1228, a mirror or digital display 1230, and a brush face cover 1231.

Figure 24A:
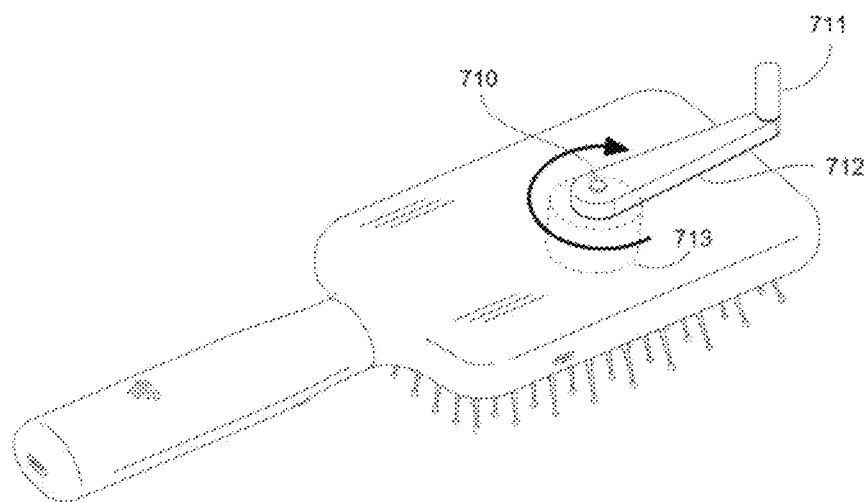
FIG. 24A is a drawing of the smart brush of the present invention with a personal wind-up electric generator in which at least one of the embodiments is shown.

FIG. 24A shows drawing of the smart brush of the present invention with a personal wind-up electric generator. FIG. 24A also shows a shaft 710, a crank handle 711, a hand crank 712, and a personal electric generator 713.

In an embodiment, a smart brush comprises a data/power connector, i.e. USB or HDMI 142, as shown in FIG. 6A, and a battery 157, as shown in FIG. 3, and may also comprise a personal electric generator 713, i.e. hand crank operated electric generator 712, as shown in FIG. 24A, and as shown in FIG. 7, at least one processor 146, modem 147, a first memory location 148, audio/visual module 150, SIM card 149, GPS module 151, motion module 700, camera module 152, power module 153, microphone 156, speaker 155, antenna 158, and as shown in FIG. 2A a physical input buttons 125, a biometric scanner 140, i.e. finger scanner, as shown in FIGS. 5 and 6, a solar panel 143, display 139, fiducial marker 144; a light, i.e. LED light 171, touchpad 172, as shown in FIG. 9; haptic vibration module 707 as shown in FIG. 7, and projector, i.e. a digital display projector capable of projecting a moving image on a wall. Often a user may find that it frequently happens that her primary digital device, i.e. a smartphone, is not ready and available for use. There are many reasons why this might take place. Her smartphone might become lost, or the battery may have become depleted, or her smartphone might be stolen, or it might have become damaged. In this case, it is possible to use the smart brush as a backup device in order to send communications over a wireless network, i.e. a phone call, text message, photo, video, email, voice command, or other data transmission. It is also possible to transmit wireless video to other devices including a television, computer, set top box, dongle stick, laptop, tablet, or smartphone.

Figure 24B:
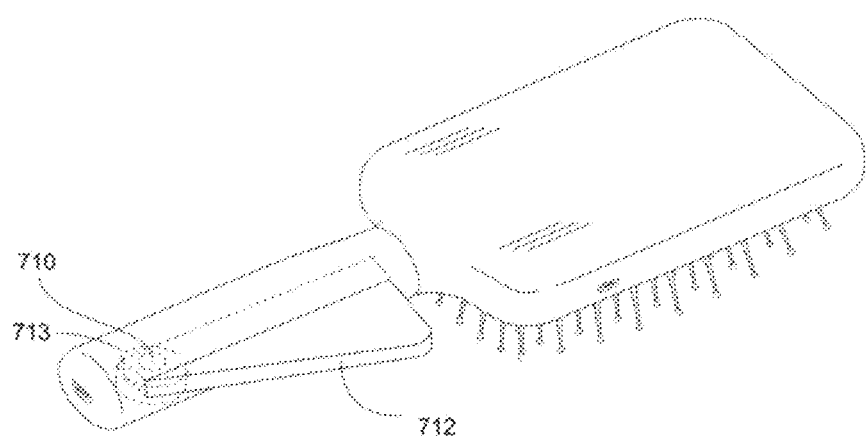
FIG. 24B is a drawing of the smart brush of the present invention with a personal push crank electric generator in which at least one of the embodiments is shown.

FIG. 24B shows a drawing of the smart brush of the present invention with a personal push crank electric generator. FIG. 24B also shows a shaft 710, crank handle 711, hand crank 712, and a personal electric generator 713.

Figure 25:
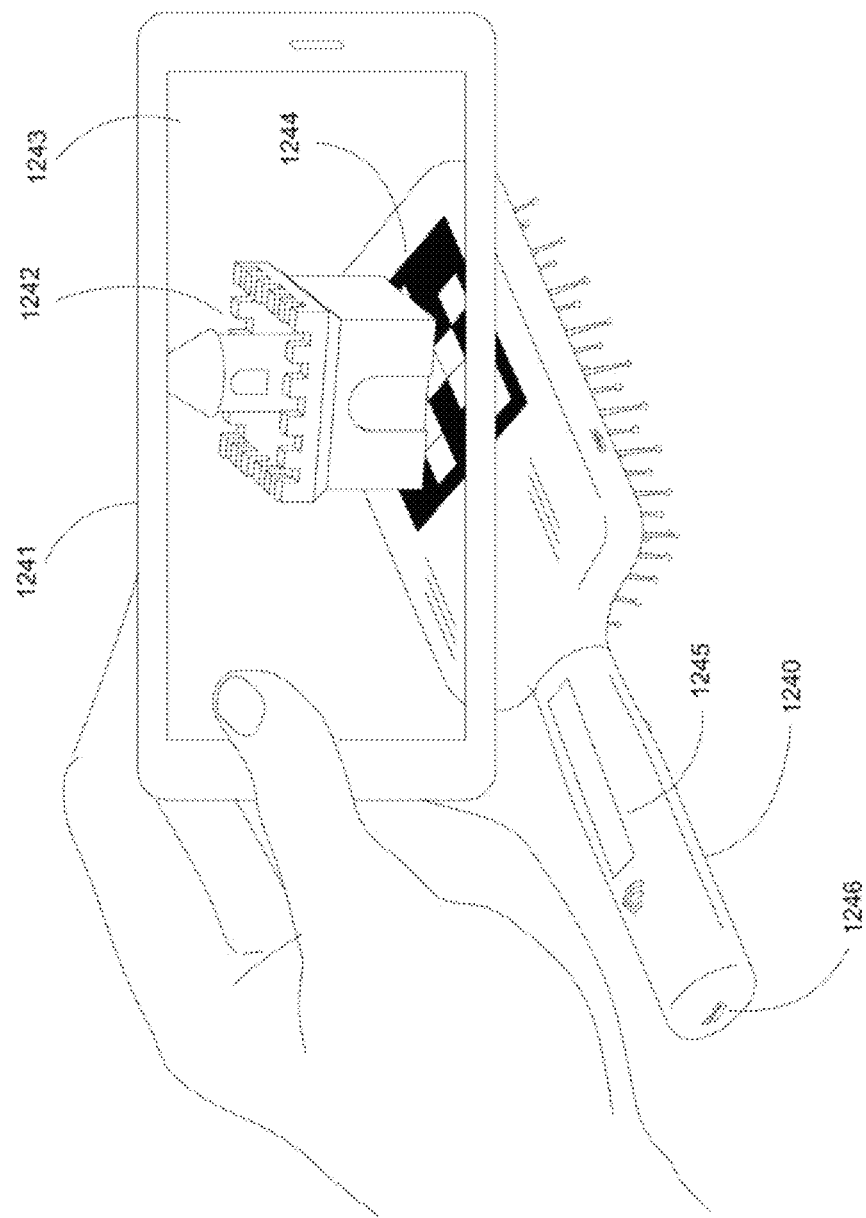
FIG. 25 is a drawing of the present invention with a fiducial marker in which at least one of the embodiments is shown.

FIG. 25 shows drawing of the present invention with a fiducial marker. FIG. 25 also shows a smart brush with fiducial marker 1240, a digital device with display, i.e. smartphone 1241, a 3D model 1242, a digital display 1243, a fiducial marker 1244, a touchpad 1245, and a data/power connector i.e. USB 1246.

As shown in FIG. 25, with one embodiment of the smart brush described in this disclosure, a user, using an augmented reality (AR) capable device i.e. a smartphone with AR software and hardware capabilities, uses the fiducial marker on the smart brush, to map digital content onto the brush. Fiducial markers are often used to aid computer vision systems to detect objects in 3D space using only cameras. It should be understood that the term fiducial marker should be understood to mean any 2D or 3D shape or pattern which can be used to track an object in 3D space using a camera, which may include graphic patterns, 3D relief patterns, lights which may include infrared lights, or any other distinctive style or design elements applied to the object which aid in tracking the object using cameras. A smart brush with a fiducial marker may be used to manipulate 3D digital models or content simply by moving the brush in real 3D space. Using an RF signal, i.e. Bluetooth, it is possible to connect the smart brush to another digital device with AR capabilities, including head mounted displays (HMDs). Once connected, it is possible to use the touchpad or other input buttons or motion tracking of the digital smart brush to remotely manipulate 2D and 3D digital content, including scaling a 3D model, scrubbing a video, starting or stopping a video, changing a 3D scene. It is also possible to use the smart brush as a remote controller for 3D input for an AR or VR device or HMD. It is also possible to fully track the smart brush in real 3D space using an external motion tracking system, or internal inside out motion tracking system. One method for tracking the smart brush is to use an AR or VR device with one or more cameras which can detect the fiducial marker on the smart brush in 3D space. In some instances input data, which may include camera data, motion data, 3D depth camera data, may be input into a machine learning model, which can return as output the 3D position of the smart brush remote controller. It is also possible to use the smart brush as a 3D controller for AR or VR systems, allowing a user to do 3D AR or VR drawing, i.e. the Google owned software Tilt Brush, or any other task which can commonly be done with a motion controller for AR or VR systems.

In one embodiment a remote user sends a 3D model 1242 over a network to a user with a smart brush comprising a fiducial marker 1240. The smart brush may also comprise a touch pad 1245. The 3D model can be sent as a message i.e. text message, email, instant message, or downloaded from an app i.e. Facebook or Snapchat. Any other method of transferring the 3D model data from a remote user to the user with the smart brush is also possible. The 3D model can be received by the smart brush user using an AR capable digital device 1241, i.e. a smartphone with a camera, smart brush, head-mounted display or any other computing device. Once the 3D model has been received on the user's AR-capable digital device, the 3D model can be mapped onto the fiducial maker 1244 of the smart brush, where it can be seen as a rendered 3D model overlaid in real 3D space. The digital device receiving the 3D model uses an embedded camera to determine the position of the fiducial marker affixed to the smart brush.

The fiducial marker can either be affixed as a permanent marking, or it can be displayed on a digital display within the smart brush. Once the 3D model has been mapped to the fiducial marker on the smart brush using computer vision software, it is possible to manipulate the rendering of the 3D model simply by moving the smart brush in real 3D space. If the smart brush has a direct wireless connection to the digital device, i.e. Bluetooth, then it is also possible for the user to further manipulate the 3D model using a touchpad on the smart brush, i.e. scaling the 3D model. It is also not necessary for a smart brush when used as an AR or VR remote controller to have bristles, and can in fact be any type of digital device containing a fiducial marker, a RF connection, a battery, and at least one processor. It can also function in a similar way as described, wherein the received 3D model can be mapped to the fiducial marker and can be manipulated using the digital device.

In at least one embodiment, the present invention may comprise an apparatus for capturing at least one digital image using a portable digital device with a camera and a specialized styling device, that further comprises a rig which holds the portable digital device at a distance from the user, a digital device clip for holding the portable digital device, and a remote used for allowing the user to send a command to the portable digital device to capture at least one digital image. The portable digital device with a camera may be a smart phone. Also, the rig may comprise a telescoping arm. The apparatus may also comprise a fiducial marker. In addition, the apparatus may comprise the necessary components in order to communicate with other digital devices using an RF signal.

FIG. 26 shows drawing of the present invention comprising a digital device, i.e. a smart phone, being charged by a smart brush. FIG. 26 also shows a smart brush 701, input buttons 125, a data/power connector, i.e. USB or HDMI 142, an electric cable connector, i.e. USB 708, a digital device (i.e. phone) 178, a wireless charging base station 1247. Using the base station, which is connected to a power source, it is possible to charge the smart brush using wireless charging, also called wireless power transfer. The base station contains a power transmitter that comprises a transmitting coil that generates an oscillating magnetic field; the smart brush contains a power receiver holding a receiving coil. The magnetic field induces an alternating current in the receiving coil by Faraday's law of induction. Close spacing of the two coils, as well as shielding on their surfaces, ensure the inductive power transfer is efficient.

In this disclosure when the term bristle or bristles is used it should be understood that each bristle may comprise a single bristle or a bunch or tuft of bristles. In one or more of the exemplary embodiments, a smart brush and smart accessories may be implemented by a single party, but in most cases it will be implemented by more than one in any combination, where the smart brush and smart accessories are comprised of many hardware and software components provided by different parties. In one or more exemplary embodiments, the functions described may be implemented in hardware, software, firmware, or any combination thereof. If implemented in software, the functions may be stored on or transmitted over, as one or more instructions or code on, a computer-readable medium.

Computer-readable media include both computer storage media and communication media including any medium that facilitates transfer of a computer program from one place to another. A storage media may be any available media that can be accessed by a computer. By way of example, and not limitation, such computer-readable media can comprise RAM, ROM, EEPROM, CD-ROM or other optical disk storage, magnetic disk storage or other magnetic storage devices, or any other medium that can be used to carry or store desired program code in the form of instructions or data structures and that can be accessed by a computer. Also, any connection is properly termed a computer-readable medium. For example, if the software is transmitted from a website, server, or other remote source using a coaxial cable, fiber optic cable, twisted pair, digital subscriber line (DSL), or wireless technologies such as infrared, radio, and microwave, then the coaxial cable, fiber optic cable, twisted pair, DSL, or wireless technologies such as infrared, radio, and microwave are included in the definition of medium.

Disk and disc, as used herein, includes compact disc (CD), laser disc, optical disc, digital versatile disc (DVD), floppy disk and Blu-ray disc where disks usually reproduce data magnetically, while discs reproduce data optically with lasers. Combinations of the above should also be included within the scope of computer-readable media. It should be understood in this disclosure that Bluetooth is the same as Bluetooth. The term memory may include volatile or non-volatile (e.g., floppy disks, hard disks, CD-ROMs, flash memory, read-only memory (ROM), and random access memory (RAM)).

The method comprises receiving data from a specialized styling device, over a cellular, wireless, satellite, or other network to a special purpose computer with a non-transitory computer readable medium. In one or more of the embodiments, the functions described herein may be implemented in any combination of hardware, software, firmware, etc. The functions may be stored or transmitted as one or more software instructions, computer-executable instructions, or processor-executable instructions, or code on a tangible non-transitory computer readable medium or on a non-transitory processor-readable storage medium, if implemented in software. The steps of an algorithm, process, or method disclosed herein may be embodied in a processor-executable software module that may reside on a non-transitory computer readable medium. Non-transitory computer readable medium readable media includes both computer storage media and communication media including any medium that facilitates transfer of a computer program from one place to another. A non-transitory storage media may be any available media that may be accessed by the special purpose host computer system.

Also, combinations of the above should be included within the scope of non-transitory computer readable medium. In addition, the operations of an algorithm, process, or method may reside as one or any combination or codes, set of codes, instructions, or sets of instructions on a non-transitory machine readable medium, which may be incorporated into a computer program product.

Byway of an example, and not as a limitation, a non-transitory computer readable medium may comprise Random-Access Memory ("RAM"), Read-Only Memory ("ROM'), Programmable Read-Only Memory ("PROM"), Erasable Programmable Read-Only Memory ("EPROM"), Electrically Erasable Programmable Read-Only Memory ("EEPROM"), Compact Disc Read-Only Memory ("CD-ROM") or other optical disk storage, magnetic disk storage, or other optical or magnetic storage devices, or any other medium that may be used to store program code in the form of instructions or data structures and that may be accessed by a computer. Disk and disc, as used herein, includes compact disc ("CD"), laser disc, optical disc, digital versatile disc ("DVD"), floppy disk, and Blu-ray disc where disks usually reproduce data magnetically or optically with lasers.

Also, combinations of the above should be included within the scope of non-transitory computer readable medium. In addition, the operations of an algorithm, process, or method may reside as one or any combination or codes, set of codes, instructions, or sets of instructions on a non-transitory machine readable medium or an a non-transitory computer readable medium, which may be incorporated into a computer program product. All illustrations of the drawings are for the purpose of describing selected versions of the present invention and are not intended to limit the scope of the present invention.

The previous description of the disclosed exemplary embodiments is provided to enable any person skilled in the art to make or use the present invention. Various modifications to these exemplary embodiments will be readily apparent to those skilled in the art, and the generic principles defined herein may be applied to other embodiments without departing from the spirit or scope of the invention. Thus, the present invention is not intended to be limited to the embodiments shown herein but is to be accorded the widest scope consistent with the principles and novel features disclosed herein. These and other systems, methods, objects, features, and advantages of the present disclosure will be apparent to those skilled in the art from the following detailed description of the embodiments and drawings.

All documents mentioned herein are hereby incorporated in their entirety by reference. References to items in the singular should be understood to include items in the plural, and vice versa, unless explicitly stated otherwise or clear from the text. Grammatical conjunctions are intended to express any and all disjunctive and conjunctive combinations of conjoined clauses, sentences, words, and the like, unless otherwise stated or clear from the context.

With respect to the above, it is to be understood that the invention is not limited in its application to the details of construction and to the arrangement of the components listed or the steps set forth in the description or illustrated in the drawings. The various apparatus and methods of the disclosed invention are capable of other embodiments, and of being practiced and carried out in various ways that would be readily known to those skilled in the art, given the present disclosure. Further, the terms and phrases used herein are for descriptive purposes and should not be construed as in any way limiting.

As such, those skilled in the art will appreciate that the conception upon which this disclosure is based be utilized as a basis for designing other inventions with similar properties. It is important therefore that the embodiments, objects, and claims herein, be regarded as including such equivalent construction and methodology insofar as they do not depart from the spirit and scope of the present invention.

It should be noted that the components in the figures are not necessarily to scale, emphasis instead being placed upon illustrating the principles of the invention. Moreover, in the figures, like reference numerals designate corresponding parts throughout the different views. However, like parts do not always have like reference numerals. Moreover, all illustrations are intended to convey concepts, where relative sizes, shapes, and other detailed attributes may be illustrated schematically rather than literally or precisely.

Additional Description, part of the original U.S. Ser. No. 16/030,792 application.

1. A computer-implemented method for predicting a negative life event, including the onset of a disease, using hair grooming data, comprising:

generating, with at least one processor, an initial usage data model from at least one specialized styling device based on inputted information;

storing the initial usage data model on a cloud based computer;

generating, with at least one processor, a user's actual usage data of at least one specialized styling device, by measuring a user's pattern of use of the at least one specialized styling device;

storing the user's actual usage data in a first memory location;

receiving the user's actual usage data and storing in a remote second memory location in the cloud based computer;

generating a prediction based on analyzing, with at least one processor, the user's actual usage data using the initial usage data model stored on the cloud based computer;

transmitting an alert command to the specialized styling device, that will activate a notification indicator on the specialized styling device if the prediction indicates that the chances of a negative life event may be likely;

transmitting a signal to a caregiver if the prediction indicates that the chances of a negative life event may be likely;

wherein the specialized styling device is selected from a group consisting of a brush, comb, hair clip, toothbrush, and a brush for pets and animals;
wherein the inputted information is based on recommendations by a caregiver and one or more users daily routines; and
wherein the notification indicator may comprise an indicator light, digital display, speaker, or haptic vibration module.

2. The method of claim 1, wherein the initial usage data model comprises a machine learning model.

3. The method of claim 1, wherein the negative life event comprises the onset of dementia, a change in the user's ability, the onset of depression, or another medical event.

4. A specialized styling device, comprising:
an enclosure body;
a plurality of bristles used for manipulating a user's hair;
at least one a circuit board;
at least one processor;
at least one modem;
at least one memory;
at least one SIM;
at least one SIM card slot;
at least one audio/video module;
at least one motion module/accelerometer;
at least one speaker;
at least one microphone;
at least one antenna;
at least one power module;
at least one data/power connector used for charging either a digital device or another device, and transmitting data;
at least one notification indicator; and at least one battery used for storing an electrical charge;
wherein the specialized styling device is selected from a group consisting of a brush, comb, and hairclip; and
wherein the notification indicator may comprise an indicator light, digital display, speaker, or haptic vibration module.

5. The specialized styling device of claim 4, further comprising a detachable handle.

6. The specialized styling device of claim 4, further comprising a finger scanner.

7. The specialized styling device of claim 4, further comprising a solar panel.

8. The specialized styling device of claim 4, wherein the power module can be used for wireless charging.

9. The specialized styling device of claim 4, further comprising the necessary components in order to play music.

10. The specialized styling device of claim 4, further comprising a digital camera.

11. The specialized styling device of claim 4, further comprising a personal electric generator used for charging up the specialized styling device 12. The specialized styling device of claim 4, further comprising at least one a communications jack for a headphone cable;

13. The specialized styling device of claim 4, further comprising at least one physical input button;

14. The specialized styling device of claim 4, further comprising at least one panel light;

15. An apparatus for capturing at least one digital image using a portable digital device with a camera and a specialized styling device, comprising:
a rig which holds the portable digital device at a distance from the user;
a digital device clip for holding the portable digital device; and
a remote used for allowing the user to send a command to the portable digital device to capture at least one digital image.

16. The apparatus of claim 15, wherein the portable digital device with a camera is a smart phone.

17. The apparatus of claim 15, wherein the rig comprises a telescoping arm.

18. The apparatus of claim 4, further comprising a fiducial marker.

19. The apparatus of claim 4, further comprising the necessary components in order to communicate with other digital devices using an RF signal.

What is claimed:

1. A specialized brushing device, comprising:
a smart brush;
a charging base station,
the smart brush comprising an enclosure body, a handle, a brush and a head with bristles,
wherein the enclosure body comprises a circuit board, a processor, a wireless module, a first memory location, and a motion module which further comprises an accelerometer, a power module, an input button, a battery, and a wireless charging power receiver;
the charging base station comprising a power source connection using a power cable, and a power transmitter;
a notification indicator comprising at least one selected from an indicator light, a speaker, a haptic vibration module, and an audio module;
a combination of smart devices including a smart speaker, a virtual assistant communicatively coupled using a local or wide area network, and a web app; and
a cloud server communicatively coupled to the specialized brushing device using the network;
wherein the cloud server and the combination of smart devices comprise a graphical user interface, a middleware software, a backend database, and a server hardware, wherein the middleware software comprises a personal profile of a user with information about the user comprising at least one of their name, age, and contact information, and wherein the cloud server is accessible from the web app viewable from the users' computing devices;
wherein a detection by the motion module of the smart brush is stored as sensor data in the first memory location or is directly sent via a local network, wide area network, or cloud network, to the cloud server; and wherein the processor of the smart brush or the cloud server generates the user's usage data of the specialized brushing device by analyzing at least one of the sensor data and the user's pattern of use of the specialized brushing device; and
wherein the user's usage data is then stored in a remote second memory location of the cloud server and is input into a data model; and
wherein the smart brush in combination with the cloud server is programmed to understand the user's daily routine, using the user's usage data and the data model to determine whether the smart brush is being used less frequently than the data model recommends.

2. The specialized brushing device of claim 1, wherein the smart brush is a smart hairbrush or a smart toothbrush, and wherein the head of the smart toothbrush is detachable.

3. The specialized brushing device of claim 2, wherein the virtual assistant is configured to receive voice commands input by a microphone, and transmit the commands to a server or cloud network, wherein the commands are interpreted and executed by an artificial intelligent agent.

4. The specialized brushing device of claim 1, wherein the sensor data is further analyzed to create metadata which includes time of use, duration of use, and directional information.

5. The specialized brushing device of claim 4, wherein the data model and at least one of the user's usage data, the metadata, and the sensor data is used to generate a report, and the report includes an indication of whether the smart brush is being used less frequently than the data model's recommended duration and frequency, and wherein the report is viewable on the users' computing devices which includes a smartphone.

6. The specialized brushing device of claim 5, wherein the data model is a machine learning model which has been trained using labeled training data, including at least one of usage data, meta data, and sensor data, to provide automated recommendations.

7. The specialized brushing device of claim 1, wherein the battery is recharged using power from the power module which is coupled to the wireless charging power receiver, wherein the charging base station uses one or more magnets in order to couple the smart brush and the charging base station together while charging.

8. The specialized brushing device of claim 1, wherein the wireless charging power receiver comprises a receiving coil, and
    wherein the charging base station's power transmitter comprises a transmitting coil that generates an oscillating magnetic field, wherein the battery of the smart brush is charged using wireless charging.

9. The specialized brushing device of claim 8, wherein the wireless module is used to send a set of data, transmitted from the specialized brushing device using at least one wireless data network link.

10. The specialized brushing device of claim 1, wherein the wireless module is configured to receive a wireless data signal to connect the smart brush to a wireless data network, wherein the smart brush is configured to connect to at least one wireless device.

11. The specialized brushing device of claim 10, wherein a notification is delivered to the user by means of at least one of the light being illuminated, a sounding of the speaker, and a vibration by the haptic vibration module.

12. A specialized brushing system, comprising:
    a smart brush, the smart brush comprising an enclosure body, a handle, a brush head with bristles; the enclosure body comprising a circuit board, a processor, a wireless module, a first memory location, a motion module, a power module, an input button, and a battery;
    a charging base station comprising:
        a power source connection using a power cable; and
        a power transmitter;
    a notification indicator comprising at least one of an indicator light, a speaker, a haptic vibration module; and an audio module;
    a combination of smart devices, including a smart speaker including a virtual assistant communicatively coupled using a local or wide area network; and
    a cloud server communicatively coupled to a specialized brush of the specialized brushing system and the combination of smart devices using the network;
        wherein the cloud server and the combination of smart devices comprise a graphical user interface, a middleware software, and a server hardware, wherein the middleware software comprises a personal profile with information about a user, and wherein the cloud server and the combination of smart devices further comprise a web app viewable using the users' computing devices including a smartphone;
    wherein a detection by the motion module of the smart brush is at least stored as sensor data in the first memory location or directly sent via a local network, wide area network, or cloud network, to the cloud server;
    wherein at least one processor of the specialized brushing system or cloud server generates the user's usage data of the specialized brush, by analyzing at least one of the sensor data and user's pattern of use of the specialized brushing system, the user's usage data is then received and stored in a remote second memory location in the cloud server; and
    wherein the smart brush in combination with the cloud server and a number of other networked devices are configured to understand the user's daily routine, using the user's usage data, wherein the usage data is input into a data model to determine if the smart brush is being used less frequently than a recommendation by the data model.

13. The specialized brushing system of claim 12, wherein the smart brush is a smart hairbrush or a smart toothbrush, and wherein the head of the smart toothbrush is detachable.

14. The specialized brushing system of claim 12, wherein the sensor data is further analyzed to create metadata which includes time of use, duration of use, and directional information.

15. The specialized brushing system of claim 14, wherein the data model and at least one of the user's usage data, the metadata, and the sensor data is used to generate a report, and the report includes an indication of whether the smart brush is being used less frequently than the data model's recommended duration and frequency, and wherein the report is viewable on the users' computing devices including the smartphone.

16. The specialized brushing system of claim 15, wherein the data model is a machine learning model which has been trained using labeled training data, including at least one of the usage data, meta data, and sensor data, to provide automated recommendations.

17. The specialized brushing system of claim 4, wherein the wireless charging power receiver comprises a receiving coil, and wherein the charging base station's power transmitter comprises a transmitting coil that generates an oscillating magnetic field, wherein the battery of the smart brush is charged using wireless charging.

18. The specialized brushing system of claim 12, wherein a notification is delivered to the user by means of at least one of the light being illuminated, a sounding of the speaker, and a vibration by the haptic vibration module, indicating a wireless connection has been made.

* * * * *